US010860414B1

(12) United States Patent
Urban et al.

(10) Patent No.: US 10,860,414 B1
(45) Date of Patent: Dec. 8, 2020

(54) CHANGE NOTIFICATION IN DISTRIBUTED FILE SYSTEMS

(71) Applicant: Qumulo, Inc., Seattle, WA (US)

(72) Inventors: Thomas Scott Urban, Seattle, WA (US); Philip Taron, Seattle, WA (US); Patrick Jakubowski, Seattle, WA (US); Thomas R. Unger, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 16/779,362

(22) Filed: Jan. 31, 2020

(51) Int. Cl.
  *G06F 11/00* (2006.01)
  *G06F 11/07* (2006.01)
  *G06F 16/182* (2019.01)
  *H04L 29/08* (2006.01)
  *H04L 9/00* (2006.01)

(52) U.S. Cl.
  CPC ...... *G06F 11/0793* (2013.01); *G06F 11/0709* (2013.01); *G06F 11/0751* (2013.01); *G06F 11/0772* (2013.01); *G06F 16/182* (2019.01); *H04L 67/1097* (2013.01); *H04L 9/00* (2013.01)

(58) Field of Classification Search
  CPC ............... G06F 11/0793; G06F 16/182; G06F 11/0772; G06F 11/0751; G06F 11/0709; H04L 67/1097; H04L 9/00
  USPC ........................................................ 714/6.1
  See application file for complete search history.

(56) References Cited

U.S. PATENT DOCUMENTS

| 5,165,031 A | 11/1992 | Pruul et al. |
| 5,319,773 A | 6/1994 | Britton et al. |
| 5,410,684 A | 4/1995 | Ainsworth et al. |
| 5,953,719 A | 9/1999 | Kleewein et al. |
| 6,236,996 B1 | 5/2001 | Bapat et al. |
| 6,385,641 B1 | 5/2002 | Jiang et al. |

(Continued)

FOREIGN PATENT DOCUMENTS

| EP | 1498829 A1 | 1/2005 |
| WO | WO0072201 A1 | 11/2000 |

OTHER PUBLICATIONS

Wikipedia clustered file system page from date Jul. 9, 2019, retrieved using the WayBackMachine, from https://web.archive.org/web/20190709083400/https://en.wikipedia.org/wiki/Clustered_file_system (Year: 2019).*

(Continued)

*Primary Examiner* — Yair Leibovich
(74) *Attorney, Agent, or Firm* — John W. Branch; Branch Partners PLLC

(57) ABSTRACT

Embodiments are directed to managing data in a file system over a network. A file system that includes a master node and client nodes may be provided. A master quorum value and a client quorum value having the same value may be provided. A profile catalog associated with the master node that includes parameters may be provided. Profile registers associated with the client nodes may be provided. Change actions may be executed on each client node based on change information provided by the master node. In response to errors, access to the file system may be suspended; the master quorum value may be modified to indicate that the file system is out of quorum; recovery actions may be executed; the client quorum value at each client node may be modified to correspond with the master quorum value; and access to the file system may be restored.

20 Claims, 9 Drawing Sheets

(56) References Cited

U.S. PATENT DOCUMENTS

| | | |
|---|---|---|
| 6,415,283 B1 | 7/2002 | Conklin |
| 6,496,944 B1 | 12/2002 | Hsiao et al. |
| 6,772,735 B2 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1* | 11/2005 | Wipfel ............... G06F 11/1482 709/201 |
| 7,213,040 B1 | 5/2007 | Stokes et al. |
| 7,636,743 B2 | 12/2009 | Erofeev |
| 7,693,876 B2 | 4/2010 | Hackworth et al. |
| 7,644,580 B2 | 11/2010 | Srivastava et al. |
| 7,937,421 B2 | 5/2011 | Mikesell et al. |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,364,648 B1 | 1/2013 | Sim-Tang |
| 8,448,170 B2 | 5/2013 | Wipfel et al. |
| 8,463,825 B1 | 6/2013 | Harty et al. |
| 8,515,911 B1 | 8/2013 | Zhou et al. |
| 8,612,404 B2 | 12/2013 | Bone et al. |
| 8,776,050 B2 | 7/2014 | Piouffe et al. |
| 8,782,655 B2 | 7/2014 | Blanding et al. |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,764 B1 | 9/2014 | Long et al. |
| 8,868,797 B1 | 10/2014 | Kirac et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,047,017 B1 | 6/2015 | Dolan et al. |
| 9,143,379 B1 | 9/2015 | Berger et al. |
| 9,158,653 B2 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,501,487 B1 | 11/2016 | Yuan et al. |
| 9,547,560 B1 | 1/2017 | Lee |
| 9,753,782 B2 | 9/2017 | Fang et al. |
| 9,753,932 B1 | 9/2017 | Brow et al. |
| 9,785,377 B2 | 10/2017 | Shin et al. |
| 10,140,185 B1 | 11/2018 | Lopez et al. |
| 10,318,401 B2 | 6/2019 | Rothschilds et al. |
| 2001/0039622 A1 | 11/2001 | Hitz et al. |
| 2002/0083073 A1 | 6/2002 | Vaidya et al. |
| 2002/0099691 A1 | 7/2002 | Lore et al. |
| 2003/0033308 A1 | 2/2003 | Patel et al. |
| 2003/0182313 A1 | 9/2003 | Federwisch et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0091663 A1 | 4/2005 | Bagsby |
| 2005/0119996 A1 | 6/2005 | Ohata et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0053139 A1 | 3/2006 | Marzinski et al. |
| 2006/0123005 A1 | 6/2006 | Burnett et al. |
| 2006/0271604 A1 | 11/2006 | Shoens |
| 2007/0027985 A1 | 2/2007 | Ramany et al. |
| 2007/0100655 A1 | 5/2007 | Kohl |
| 2007/0118561 A1 | 5/2007 | Idicula et al. |
| 2008/0028006 A1 | 1/2008 | Liu et al. |
| 2008/0059399 A1 | 3/2008 | DeLorme et al. |
| 2008/0059541 A1 | 3/2008 | Fachan et al. |
| 2008/0082593 A1 | 4/2008 | Komarov et al. |
| 2008/0172366 A1 | 7/2008 | Hannel et al. |
| 2008/0228772 A1 | 9/2008 | Piamondon |
| 2008/0256474 A1 | 10/2008 | Chakra et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0222509 A1 | 9/2009 | King et al. |
| 2009/0274047 A1 | 11/2009 | Kruys et al. |
| 2010/0036895 A1 | 2/2010 | Boyd et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 8/2010 | Susanto et al. |
| 2010/0287512 A1 | 11/2010 | Gan et al. |
| 2011/0039622 A1 | 2/2011 | Levenson |
| 2011/0066668 A1 | 3/2011 | Guarraci |
| 2011/0125799 A1 | 5/2011 | Kandasamy et al. |
| 2011/0125973 A1 | 5/2011 | Lev et al. |
| 2011/0202925 A1 | 8/2011 | Banerjee et al. |
| 2011/0246724 A1 | 10/2011 | Marathe et al. |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0136843 A1 | 5/2012 | Bone et al. |
| 2012/0166478 A1 | 6/2012 | Das et al. |
| 2012/0317079 A1 | 12/2012 | Shoens et al. |
| 2013/0191355 A1 | 7/2013 | Bone et al. |
| 2013/0227236 A1 | 8/2013 | Flynn et al. |
| 2013/0311454 A1 | 11/2013 | Ezzat |
| 2013/0318194 A1 | 11/2013 | Timbs |
| 2014/0006354 A1 | 1/2014 | Parkinson et al. |
| 2014/0040199 A1 | 2/2014 | Golab et al. |
| 2014/0040693 A1 | 2/2014 | Kim et al. |
| 2014/0101389 A1 | 4/2014 | Nellans |
| 2014/0156956 A1 | 6/2014 | Ezra |
| 2014/0181441 A1 | 6/2014 | Kottomtharayil et al. |
| 2014/0258609 A1 | 9/2014 | Cui et al. |
| 2014/0280485 A1 | 9/2014 | A Hummaida et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0067086 A1 | 3/2015 | Adriaens et al. |
| 2015/0067142 A1 | 3/2015 | Renkema |
| 2015/0135331 A1 | 5/2015 | Das |
| 2015/0193347 A1 | 7/2015 | Kluesing et al. |
| 2015/0215405 A1 | 7/2015 | Baek et al. |
| 2015/0234879 A1 | 8/2015 | Baldwin et al. |
| 2015/0242263 A1 | 8/2015 | Klose |
| 2015/0278282 A1 | 10/2015 | Sardina et al. |
| 2016/0034356 A1 | 2/2016 | Aron et al. |
| 2016/0139836 A1 | 5/2016 | Nallathambi et al. |
| 2016/0224430 A1 | 8/2016 | Long et al. |
| 2016/0246816 A1 | 8/2016 | Abiri et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0357677 A1 | 12/2016 | Hooker et al. |
| 2016/0359859 A1 | 12/2016 | Capone |
| 2016/0380878 A1 | 12/2016 | Bugenhagen et al. |
| 2017/0046143 A1 | 2/2017 | Kochhar et al. |
| 2017/0091046 A1 | 3/2017 | Bangalore et al. |
| 2017/0163728 A1 | 6/2017 | Chawla et al. |
| 2017/0201582 A1 | 7/2017 | Zhang et al. |
| 2017/0286455 A1 | 10/2017 | Li et al. |
| 2017/0316321 A1 | 11/2017 | Whitney et al. |
| 2017/0344905 A1* | 11/2017 | Hack ................... G06F 16/219 |
| 2018/0040029 A1 | 2/2018 | Zeng et al. |
| 2018/0288057 A1 | 10/2018 | Varadamma et al. |
| 2018/0314423 A1 | 11/2018 | Gong et al. |
| 2019/0095112 A1 | 3/2019 | Lingarajappa |

OTHER PUBLICATIONS

Wikipedia raft page from date Jul. 16, 2019, retrieved using the WayBackMachine, from https://web.archive.org/web/20190716115001/ https://en.wikipedia.org/wiki/Raft_(computer_science) (Year: 2019).*
Office Communication for U.S. Appl. No. 15/967,499 dated Jun. 27, 2018.
Office Communication for U.S. Appl. No. 16/226,587 dated Feb. 25, 2019.

(56) References Cited

OTHER PUBLICATIONS

Office Communication for U.S. Appl. No. 15/473,051 dated Jun. 30, 2017.
Office Communication for U.S. Appl. No. 16/004,182 dated Mar. 5, 2019.
Office Communication for U.S. Appl. No. 16/004,182 dated Aug. 23, 2018.
Office Communication for U.S. Appl. No. 16/004,208 dated Aug. 27, 2018.
European Communication and European Search Report for European Application No. 18155779.4, dated Apr. 17, 2018.
Office Communication for U.S. Appl. No. 16/262,756 dated Aug. 5, 2019.
Office Communication for U.S. Appl. No. 16/262,756 dated on Apr. 2, 2019.
Office Communication for U.S. Appl. No. 16/262,756 dated Oct. 25, 2019.
Office Communication for U.S. Appl. No. 16/659,488 dated Dec. 30, 2019.
Office Communication for U.S. Appl. No. 14/595,598 dated Dec. 31, 2019.
Office Communication for U.S. Appl. No. 16/228,716 dated Jun. 24, 2019.
Office Communication for U.S. Appl. No. 16/231,354 dated Jul. 10, 2019.
Office Communication for U.S. Appl. No. 16/226,587 dated Aug. 5, 2019.
Office Communication for U.S. Appl. No. 16/228,716 dated Feb. 28, 2019.
Office Communication for U.S. Appl. No. 16/231,354 dated Mar. 25, 2019.
Office Communication for U.S. Appl. No. 16/262,790 dated Aug. 23, 2019.
Office Communication for U.S. Appl. No. 16/262,790 dated Apr. 18, 2019.
Office Communication for U.S. Appl. No. 16/234,395 dated Aug. 8, 2019.
Office Communication for U.S. Appl. No. 16/234,334 dated Apr. 5, 2019.
Office Communication for U.S. Appl. No. 16/234,395 dated Mar. 28, 2019.
Office Communication for U.S. Appl. No. 16/234,334 dated Oct. 11, 2019.
Official Communication for U.S. Appl. No. 15/694,604 dated Jun. 3, 2019.
Official Communication for U.S. Appl. No. 16/004,182 dated Jul. 3, 2019.
Official Communication for U.S. Appl. No. 16/004,182 dated May 22, 2019.
Official Communication for U.S. Appl. No. 16/004,182 dated Jan. 7, 2020.
Official Communication for U.S. Appl. No. 14/595,043 dated May 4, 2017.
Official Communication for U.S. Appl. No. 14/595,043 dated Feb. 23, 2018.
Official Communication for U.S. Appl. No. 14/595,043 dated May 25, 2018.
Official Communication for U.S. Appl. No. 14/595,043 dated Oct. 5, 2018.
Official Communication for U.S. Appl. No. 14/595,043 dated Jun. 7, 2019.
Official Communication for U.S. Appl. No. 14/595,043 dated Aug. 27, 2019.
Official Communication for U.S. Appl. No. 14/658,015 dated Apr. 27, 2017.
Official Communication for U.S. Appl. No. 14/658,015 dated Jan. 4, 2018.
Official Communication for U.S. Appl. No. 14/658,015 dated Jul. 13, 2018.
Official Communication for U.S. Appl. No. 14/859,061 dated Sep. 22, 2017.
Official Communication for U.S. Appl. No. 15/831,236 dated Mar. 30, 2018.
Official Communication for U.S. Appl. No. 15/831,236 dated Aug. 15, 2018.
Official Communication for U.S. Appl. No. 14/859,114 dated Jul. 24, 2017.
Official Communication for U.S. Appl. No. 14/859,114 dated Feb. 21, 2018.
Official Communication for U.S. Appl. No. 14/859,114 dated May 11, 2018.
Office Communication for U.S. Appl. No. 15/694,604 dated Nov. 20, 2019.
Office Communication for U.S. Appl. No. 14/859,114 dated Jun. 27, 2018.
Office Communication for U.S. Appl. No. 14/859,114 dated Nov. 19, 2018.
Office Communication for U.S. Appl. No. 14/859,114 dated Jan. 31, 2019.
Office Communication for U.S. Appl. No. 14/859,114 dated Mar. 7, 2019.
Office Communication for U.S. Appl. No. 14/859,114 dated Sep. 13, 2019.
Office Communication for U.S. Appl. No. 14/859,114 dated Nov. 26, 2019.
Office Communication for U.S. Appl. No. 15/288,853 dated Sep. 19, 2018.
Office Communication for U.S. Appl. No. 15/288,853 dated Mar. 25, 2019.
Office Communication for U.S. Appl. No. 16/436,825 dated Jul. 11, 2019.
Office Communication for U.S. Appl. No. 15/474,047 dated Sep. 18, 2017.
Office Communication for U.S. Appl. No. 15/474,047 dated Mar. 9, 2018.
Office Communication for U.S. Appl. No. 15/474,047 dated Jun. 11, 2018.
Office Communication 2018 for U.S. Appl. No. 15/474,047 dated Aug. 15, 2018.
Office Communication for U.S. Appl. No. 15/957,809 dated Jun. 28, 2018.
Office Communication for U.S. Appl. No. 15/957,809 dated Jan. 24, 2019.
Office Communication for U.S. Appl. No. 16/434,157 dated Jul. 25, 2019.
Office Communication for U.S. Appl. No. 15/854,447 dated May 6, 2019.
Office Communication for U.S. Appl. No. 16/505,562 dated Aug. 30, 2019.
European Communication and European Search Report for European Application No. 17206518.7 dated Apr. 5, 2018.
Office Communication for U.S. Appl. No. 16/125,573 dated Nov. 21, 2019.
Office Communication for U.S. Appl. No. 16/226,587 dated Oct. 24, 2019.
Office Communication for U.S. Appl. No. 16/262,756 dated Jan. 28, 2020.
Office Communication for U.S. Appl. No. 16/434,157 dated Jan. 29, 2020.
Office Communication for U.S. Appl. No. 15/967,499 dated Jun. 27, 2018, pp. 1-25.
Office Communication for U.S. Appl. No. 16/226,587 dated Feb. 25, 2019, pp. 1-65.
Office Communication for U.S. Appl. No. 15/473,051 dated Jun. 30, 2017, pp. 1-22.
Office Communication for U.S. Appl. No. 16/004,182 dated Mar. 5, 2019, pp. 1-46.
Office Communication for U.S. Appl. No. 16/004,182 dated Aug. 23, 2018, pp. 1-46.
Office Communication for U.S. Appl. No. 16/004,208 dated Aug. 27, 2018, pp. 1-11.

(56) References Cited

OTHER PUBLICATIONS

European Communication and European Search Report for European Application No. 18155779.4, dated Apr. 17, 2018, pp. 1-15.
Office Communication for U.S. Appl. No. 16/262,756 dated Aug. 5, 2019, pp. 1-48.
Office Communication for U.S. Appl. No. 16/262,756 dated Apr. 2, 2019, pp. 1-40.
Office Communication for U.S. Appl. No. 16/262,756 dated Oct. 25, 2019, pp. 1-6.
Office Communication for U.S. Appl. No. 16/659,488 dated Dec. 30, 2019, pp. 1-35.
Office Communication for U.S. Appl. No. 14/595,598 dated Dec. 31, 2019, pp. 1-23.
Office Communication for U.S. Appl. No. 16/228,716 dated Jun. 24, 2019, pp. 1-28.
Office Communication for U.S. Appl. No. 16/231,354 dated Jul. 10, 2019, pp. 1-19.
Office Communication for U.S. Appl. No. 16/226,587 dated Aug. 5, 2019, pp. 1-55.
Office Communication for U.S. Appl. No. 16/228,716 dated Feb. 28, 2019, pp. 1-27.
Office Communication for U.S. Appl. No. 16/231,354dated Mar. 25, 2019, pp. 1-19.
Office Communication for U.S. Appl. No. 16/262,790 dated Aug. 23, 2019, pp. 1-20.
Office Communication for U.S. Appl. No. 16/262,790 dated Apr. 18, 2019, pp. 1-24.
Office Communication for U.S. Appl. No. 16/234,395 dated Aug. 8, 2019, pp. 1-28.
Office Communication for U.S. Appl. No. 16/234,334 dated Apr. 5, 2019, pp. 1-24.
Office Communication for U.S. Appl. No. 16/234,395 dated Mar. 28, 2019, pp. 1-36.
Kappes et al. "Virtualization-aware Access Control for Multitenant Filesystems", University of Ioannina, Greece, Technical Report No. DCS2013-1, 8, 61-64, (Year: 2013), pp. 1-6.
Hitz et al. "Merging NT and UNIX filesystem permissions", In Proceedings of the 2nd conference on USENIX Windows NT Symposium—vol. 2 (pp. 10-10). USENIX Association. (Year: Aug. 1998), pp. 1-10.
Office Communication for U.S. Appl. No. 16/234,334 dated Oct. 11, 2019, pp. 1-22.
Official Communication for U.S. Appl. No. 15/694,604 dated Jun. 3, 2019, pp. 1-14.
Official Communication for U.S. Appl. No. 16/004,182 dated Jul. 3, 2019, pp. 1-50.
Official Communication for U.S. Appl. No. 16/004,182 dated May 22, 2019, pp. 1-6.
Official Communication for U.S. Appl. No. 16/004,182 dated Jan. 7, 2020, pp. 1-54.
Official Communication for U.S. Appl. No. 14/595,043 dated May 4, 2017, pp. 1-38.
Official Communication for U.S. Appl. No. 14/595,043 dated Feb. 23, 2018, pp. 1-22.
Official Communication for U.S. Appl. No. 14/595,043 dated May 25, 2018, pp. 1-14.
Official Communication for U.S. Appl. No. 14/595,043 dated Oct. 5, 2018, pp. 1-26.
Official Communication for U.S. Appl. No. 14/595,043 dated Jun. 7, 2019, pp. 1-29.
Official Communication for U.S. Appl. No. 14/595,043 dated Aug. 27, 2019, pp. 1-34.
Official Communication for U.S. Appl. No. 14/658,015 dated Apr. 27, 2017, pp. 1-8.
Official Communication for U.S. Appl. No. 14/658,015 dated Jan. 4, 2018, pp. 1-35.
Official Communication for U.S. Appl. No. 14/658,015 dated Jul. 13, 2018, pp. 1-18.
Official Communication for U.S. Appl. No. 14/859,061 dated Sep. 22, 2017, pp. 1-29.
Official Communication for U.S. Appl. No. 15/831,236 dated Mar. 30, 2018, pp. 1-8.
Official Communication for U.S. Appl. No. 15/831,236 dated Aug. 15, 2018, pp. 1-27.
Official Communication for U.S. Appl. No. 14/859,114 dated Jul. 24, 2017, pp. 1-165.
Official Communication for U.S. Appl. No. 14/859,114 dated Feb. 21, 2018, pp. 1-27.
Official Communication for U.S. Appl. No. 14/859,114 dated May 11, 2018, pp. 1-7.
Office Communication for U.S. Appl. No. 15/694,604 dated Nov. 20, 2019, pp. 1-24.
Office Communication for U.S. Appl. No. 14/859,114 dated Jun. 27, 2018, pp. 1-40.
Office Communication for U.S. Appl. No. 14/859,114 dated Nov. 19, 2018, pp. 1-41.
Office Communication for U.S. Appl. No. 14/859,114 dated Jan. 31, 2019, pp. 1-5.
Office Communication for U.S. Appl. No. 14/859,114 dated Mar. 7, 2019, pp. 1-39.
Office Communication for U.S. Appl. No. 14/859,114 dated Sep. 13, 2019, pp. 1-8.
Office Communication for U.S. Appl. No. 14/659,114 dated Nov. 26, 2019, pp. 1-43.
Office Communication for U.S. Appl. No. 15/288,853 dated Sep. 19, 2018, pp. 1-27.
Chimera, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 dated Mar. 25, 2019, pp. 1-25.
Cudre-Mauroux, et al., "TrajStore: An Adaptive Storage System for Very Large Trajectory Sets", ICDE 2010, Long Beach, CA, Mar. 1-6, 2010, pp. 109-120.
Office Communication for U.S. Appl. No. 16/436,825 dated Jul. 11, 2019, pp. 1-22.
Office Communication for U.S. Appl. No. 15/474,047 dated Sep. 18, 2017, p. 1-24.
Office Communication for U.S. Appl. No. 15/474,047 dated Mar. 9, 2018, pp. 1-12.
Office Communication for U.S. Appl. No. 15/474,047 dated Jun. 11, 2018, pp. 1-7.
Office Communication for U.S. Appl. No. 15/474,047 dated Aug. 15, 2018, pp. 1-24.
Office Communication for U.S. Appl. No. 15/957,809 dated Jun. 28, 2018, pp. 1-42.
Office Communication for U.S. Appl. No. 15/957,809 dated Jan. 24, 2019, pp. 1-24.
Office Communication for U.S. Appl. No. 16/434,157 dated Jul. 25, 2019, pp. 1-16.
Office Communication for U.S. Appl. No. 15/854,447 dated May 6, 2019, pp. 1-31.
Office Communication for U.S. Appl. No. 16/505,562 dated Aug. 30, 2019, pp. 1-46.
European Communication and European Search Report for European Application No. 17206518.7 dated Apr. 5, 2018, pp. 1-8.
Karatza et al. Epoch load sharing in a network of workstations, Simulation Symposium, 2001. Proceedings. 34th Annual April 22-26, 2001, Piscataway, NJ, USA, IEEE, Apr. 22, 2001 (Apr. 22, 2001), pp. 36-42, XP010541274, ISBN: 978-0-7695-1092-7.
Office Communication for U.S. Appl. No. 16/125,573 dated Nov. 21, 2019, pp. 1-24.
Office Communication for U.S. Appl. No. 16/226,587 dated Oct. 24, 2019, pp. 1-6.
Office Communication for U.S. Appl. No. 16/234,334 dated Jan. 16, 2020, pp. 1-8.
Office Communication for U.S. Appl. No. 16/262,756 dated Jan. 28, 2020, pp. 1-27.
Office Communication for U.S. Appl. No. 16/434,157 dated Jan. 29, 2020, pp. 1-12.

* cited by examiner

CHANGE NOTIFICATION IN DISTRIBUTED FILE SYSTEMS

TECHNICAL FIELD

The present invention relates generally to file systems, and more particularly, but not exclusively, to managing change notification for distributed file systems.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. In many cases, it may be desirable to change or alter configuration information, associated with a distributed file systems. However, the distributed nature of a distributed file system may interfere with reliable distribution of the change information across the various nodes or computers that comprise the file system. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
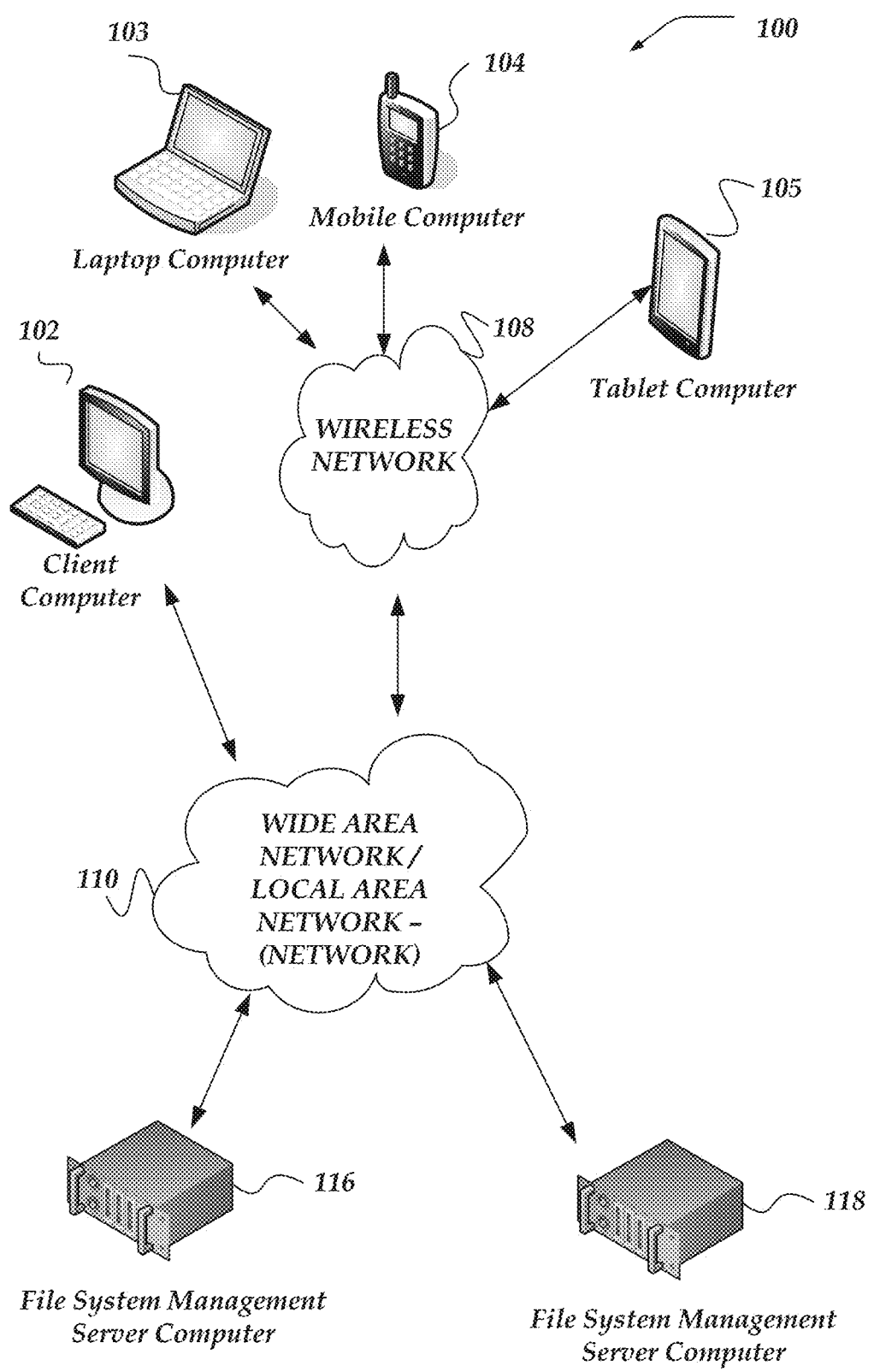
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein. the term "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the terms "file system object," or "object" refer to entities stored in a file system. These may include files, directories, or the like. In this document for brevity and clarity all objects stored in a file system may be referred to as file system objects.

As used herein, the term "file system" refers to storage systems that may include one or more storage devices, one or more servers, one or more nodes, or the like. Typically, file systems may be arranged to support one or more conventional/standards-based file system protocols, or the like. In some cases, file system may be distributed across multiple nodes, servers, networks, or the like.

As used herein, the term "storage unit" refers to storage component in a file system. Accordingly, storage devices, storage enclosures, cluster nodes, clusters, or the like, be considered storage units. The particular component represented by a storage unit may depend on context. For example, in some cases, a single hard drive may be considered a storage unit, where in other cases, a node computer in distributed file system may be considered a single storage unit, even though the node computer may include server hard drives, solid state drives, or the like.

As used herein, the term "profile information" refers a collection of parameter values, records, or the like, that may represent configuration information values or various settings associated with a distributed file system. Profile information for each node may be considered to be consistent across nodes or file system portion of a distributed file system. In some cases, profile information for different nodes in the same distributed file system may become inconsistent. Accordingly, in such cases, a file system management computer may be tasked to perform various actions to bring the file system back a consistent state resulting in consistent profile information across the nodes of the distributed file system.

As used herein, the term "master node" refers to a network computer that is part of a cluster of network computers in a distributed file system that may be permanently or temporarily acting as a central coordinator or controller of other nodes in the same cluster. In some cases, a network computer may be a master node for one or more tasks or roles while other network computers in the same clusters may be master nodes for different tasks or roles.

As used herein, the term "client node" refers to a network computer that is part of a cluster of network computers in a distributed file system that may be permanently or temporarily acting as a client or follower for one or more master nodes in the same cluster. In some cases, a network computer may be a client node with respect to one or more tasks or roles while at the same time it may be a master mode with respect to other different tasks or roles.

As used herein, the term "profile catalog" refers to one or more data structures that may be used to store or manage configuration information or change information in distributed file systems. Nodes of a distributed file system may be expected to rely on or be responsive to the configuration information in the profile catalog.

As used herein, the term "profile register" refers to one or more data structures that may be used to store or manage configuration information or change information in distributed file system. Individual nodes of a distributed file system may maintain local profile registers based on the profile catalog of the distributed file system.

As used herein, the term "profile engine" refers to an engine that may be arranged to manage profile catalogs, profile registers, change notifications, or the like. Each node in a distributed file system may be associated with a profile engine.

As used herein, the term "master profile engine" refers to a profile engine that may be arranged to manage profile catalogs, change notifications, quorums, or the like. The master profile engine may be associated with the master node of a distributed file system. Master profile engines on master nodes work with profile engines associated with client nodes for change notification in distributed file systems.

As used herein, the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system over a network. In one or more of the various embodiments, a file system that includes a master node and one or more client nodes may be provided. The master node may be associated with a master quorum value and the one or more client nodes may be associated with a client quorum value that may be equivalent to master quorum value.

In one or more of the various embodiments, a profile catalog associated with the master node may be provided. The profile catalog may include a plurality parameters associated with the file system. In one or more of the various embodiments, the plurality of parameters may include values representing one or more of encryption settings, replication schedules, timeout values, or the like.

In one or more of the various embodiments, one or more profile registers associated with the one or more client nodes may be provided. Each profile register may be associated with one or more parameters of the plurality of parameters. In one or more of the various embodiments, providing the one or more profile registers may include: associating the one or more parameters with one or more parameter identifiers stored in the one or more profile registers; associating the one or more change actions with the one or more parameter identifiers; or the like.

In one or more of the various embodiments, one or more change actions may be executed on each client node based on change information provided by the master node. The change information may be associated the one or more parameters. In one or more of the various embodiments, executing the one or more change actions, may include: determining one or more parameter values based on the change information; performing one or more operations to configure the one or more client nodes based on the one or more parameter values; communicating an error message to the master node when the one or more operations results in an error; or the like.

In one or more of the various embodiments, one or more parameter identifiers may be determined based on the change information. In some embodiments, the one or more change actions may be determined based on the one or more parameter identifiers and the one or more profile registers.

In one or more of the various embodiments, in response to one or more error results associated with the execution of the one or more change actions, further actions may be performed including: suspending access to the file system; modifying the master quorum value to indicate that the file system may be out of quorum; employing the master node to execute one or more recovery actions that distribute the plurality of parameters to each client node in the file system; modifying the client quorum value at each client node to correspond with the master quorum value such that access to the file system may be restored.

In one or more of the various embodiments, executing one or more recovery actions, may include: executing the one or more change actions that may be associated with each of the plurality of parameters; comparing a value of each parameter on each client node to a value of each of the plurality parameters stored in the profile catalog; in response to a comparison result indicating a mismatch between one or more parameter values on a client node to one or more of the plurality parameter values stored in the profile catalog, the execution of the one or more recovery actions may be retried; in response to a failure of the one or more recovery actions, one or more notifications may be generated to indicate that a change notification has failed and access to the file system remains suspended; or the like.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, file system management server computer 116, file system management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language.

In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, file system management server computer 116, file system management server computer 118, or other computers.

Client computers 102-105 may further be configured to include a client application that enables an end-user to log into an end-user account that may be managed by another computer, such as file system management server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by file system management server computer 116, file system management server computer 118, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, file system management server computer 116, file system management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of file system management server computer 116, or file system management server computer 118 is described in more detail below in conjunction with FIG. 3. Although FIG. 1 illustrates file system management server computer 116, file system management server computer 118, or the like, each as a single computer, the innovations or embodiments are not so limited. For example, one or more functions of file system management server computer 116, file system management server computer 118, or the like, may be distributed across one or more distinct network computers. Moreover, in one or more embodiments, file system management server computer 116, file system management server computer 118, or the like, may be implemented using a plurality of network computers. Further, in one or more of the various embodiments, file system management server computer 116, file system management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
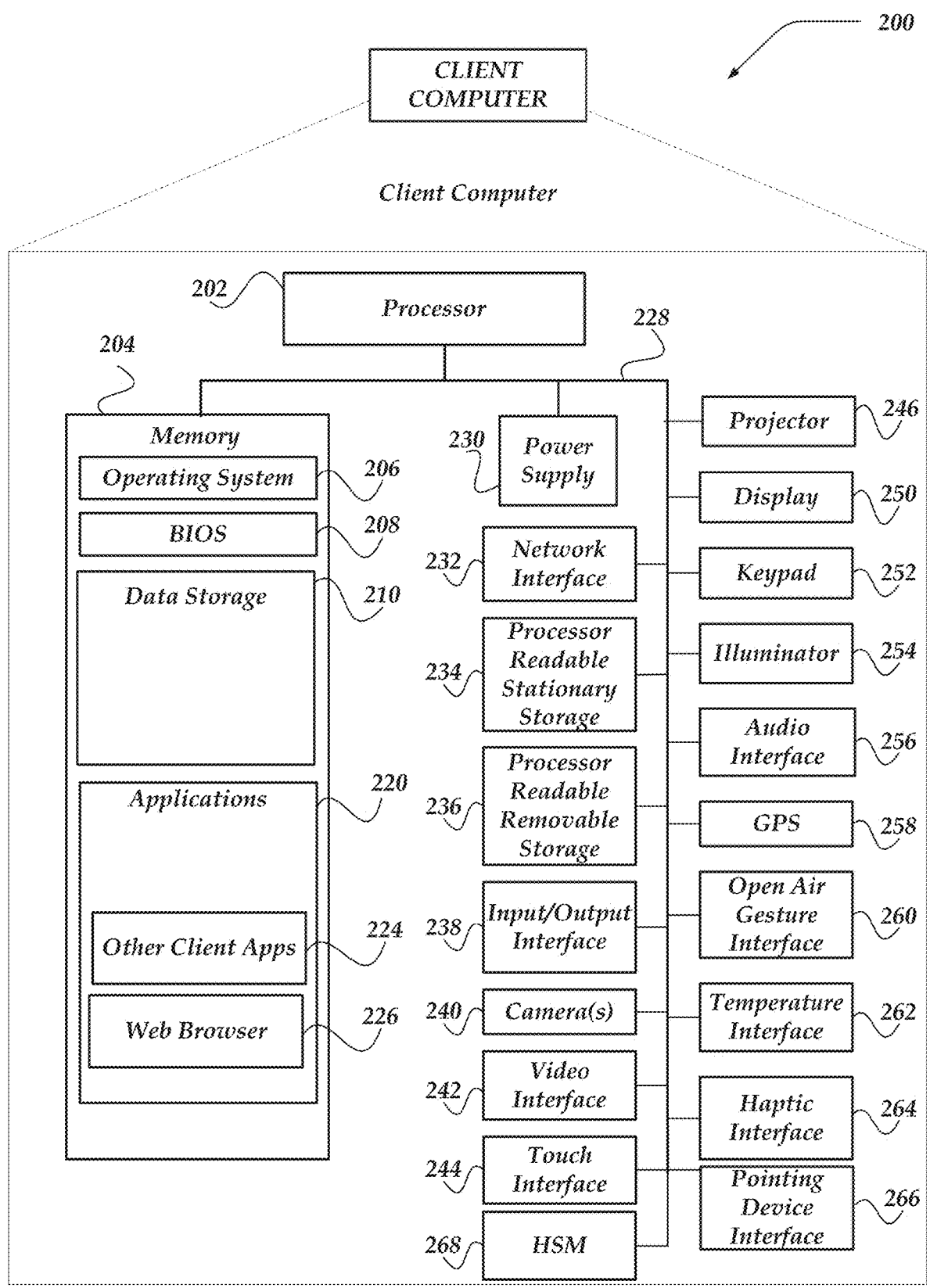
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client user interface engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
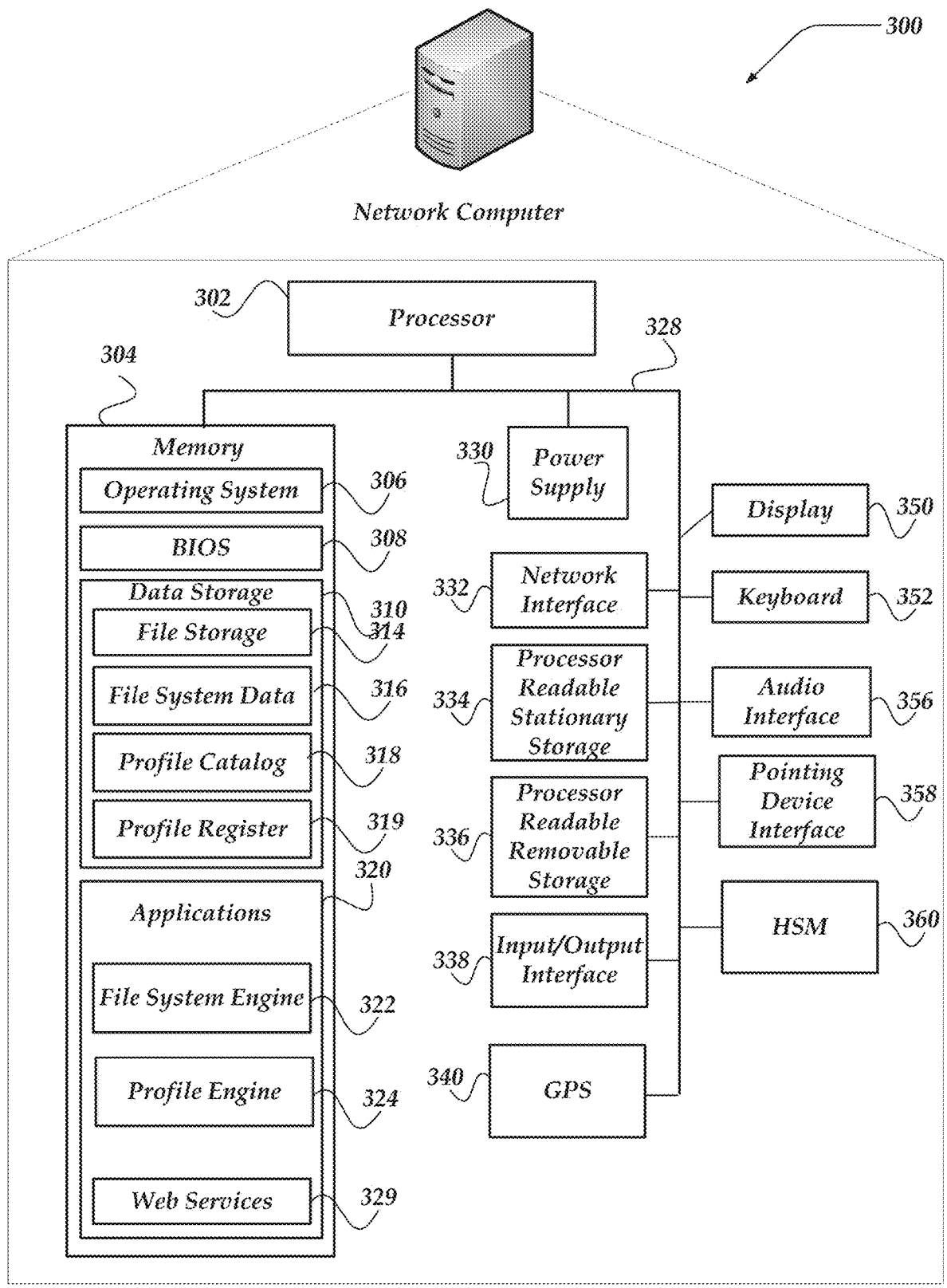
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 116, file system management server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, file system data 316, profile catalog 318, profile register 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, profile engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, profile engine 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, profile engine 324, web services 329, or the like, may be provisioned and de-commissioned automatically.

Also, in one or more of the various embodiments, file system engine 322, profile engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
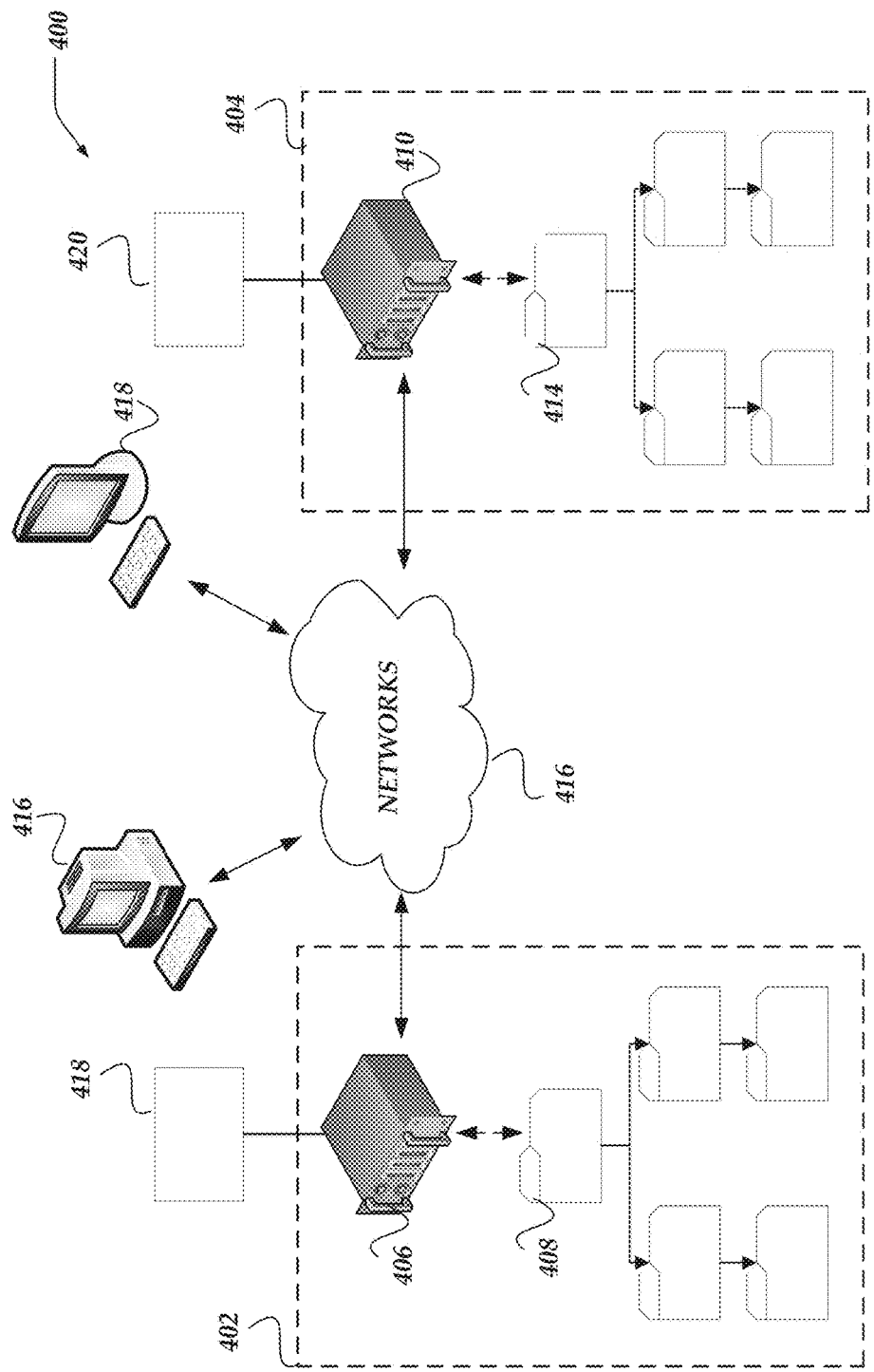
FIG. 4 illustrates a logical architecture of a system for change notification in distributed file systems in accordance with one or more of the various embodiments.

FIG. 4 illustrates a logical architecture of system 400 for change notification in distributed file systems in accordance with one or more of the various embodiments. In one or more of the various embodiments, two or more file systems, such as, file system 402 and file system 404 may be arranged to be communicatively coupled to one or more networks, such as, networks 416. Accordingly, in one or more of the various embodiments, one or more clients, such as, client computer 416 and client computer 418 may be arranged to access file system 402 or file system 404 over networks 416. In some embodiments, clients of file system 402 or file system 404 may include users, services, programs, computers, devices, or the like, that may be enabled to perform one or more file system operations, such as, creating, reading, updating, or deleting data (e.g., file system objects) that may be stored in file system 402 or file system 404. In some embodiments, file system 402 or file system 404 may comprise one or more file system management computers, such as file system management computer 406 or file system management computer 410. Also, in one or more of the various embodiments, file systems, such as file system 402 or file system 404 may include one or more file system objects, such as file system object 408 or file system object 414. file system object 412 or file system object 414 may represent the various objects or entities that may be stored in file system 402 or file system 404. In some embodiments, file system objects may include, files, documents, directories, folders, backups, snapshots, or the like.

In one or more of the various embodiments, the implementation details that enable file system 402 or file system 404 to operate may be hidden from clients, such that they may be arranged to use file system 402 or file system 404 the same way they use other conventional file systems, including local file systems. Accordingly, in one or more of the various embodiments, clients may be unaware that they are using a distributed file system that supports replicating file objects to other file systems because file system engines or replication engines may be arranged to mimic the interface or behavior of one or more standard file systems.

Also, while file system 402 and file system 404 are illustrated as using one file system management computer each with one set of file system objects, the innovations are not so limited. Innovations herein contemplate file systems that include one or more file system management computers or one or more file system object data stores. In some embodiments, file system object stores may be located remotely from one or more file system management computers. Also, a logical file system object store or file system may be spread across two or more cloud computing environments, storage clusters, or the like.

As described above, in one or more of the various embodiments, distributed file systems may be comprised of two or more file system management computers. Accordingly, in one or more of the various embodiments, each file system in a distributed file system may be arranged to maintain local records or local databases to manage file system wide changes. Further, in some embodiments, systems, such as system 400 that include more than one distributed file system (e.g., mirrored pairs, or the like) may be arranged to have databases for managing profile information across the various distributed file systems included in the entire system.

In this example, for some embodiments, profile system 418 and profile system 420 represent the one or more profile engines, one or more profile catalogs, or the like, that may be included in a file system. Accordingly, profile system 418 may be comprised of: one or more profile catalogs, such as, profile catalog 318; one or more profile registers, such as, profile register 319; one or more profile engines, such as, profile engine 324; or the like. In some embodiments, profile systems may hosted or executed by network computers, such as, network computer 300.

Figure 5:
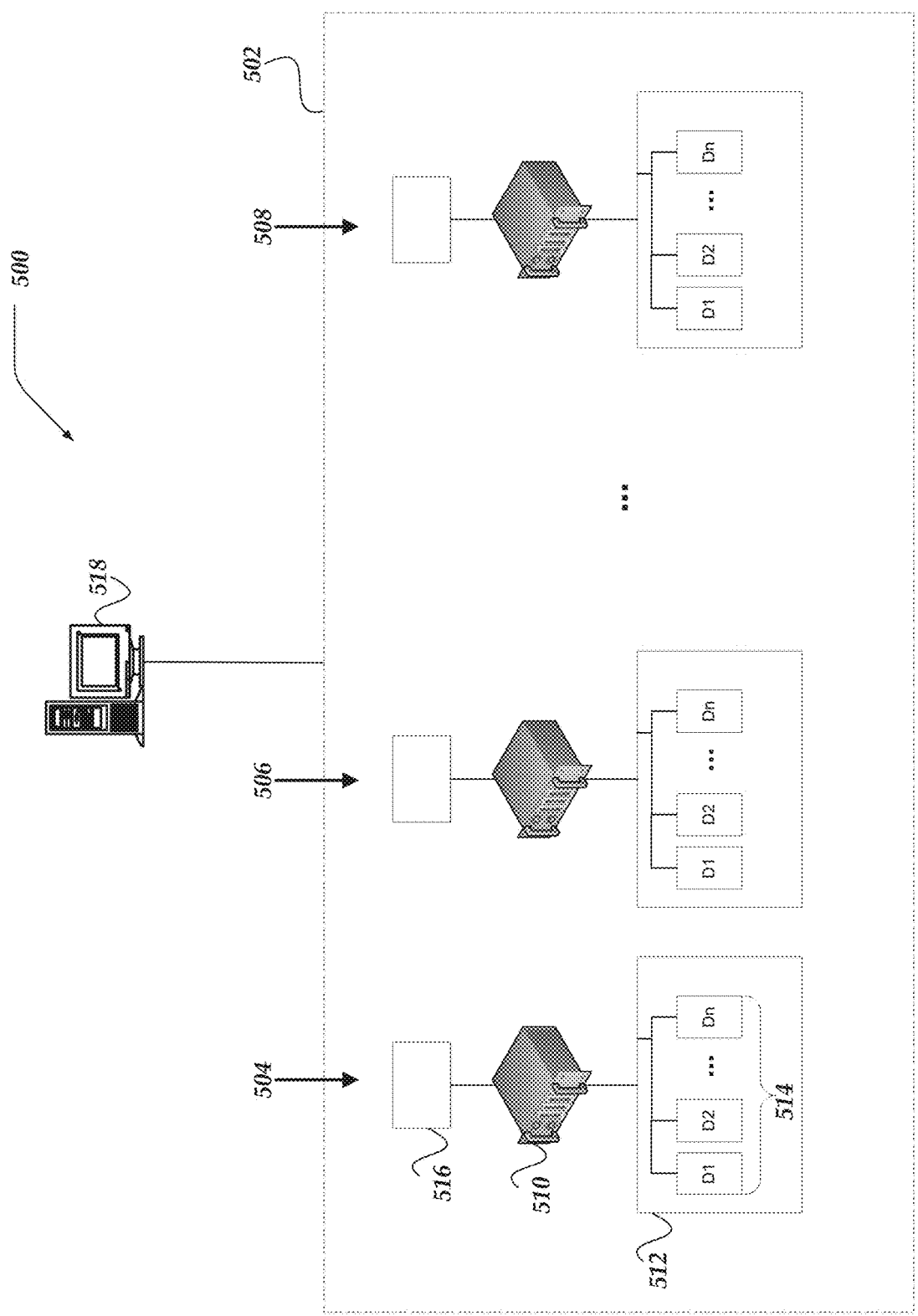
FIG. 5 illustrates a logical schematic of a system for change notification in distributed file systems in accordance with one or more of the various embodiments.

FIG. 5 illustrates a logical schematic of system 500 for change notification in distributed file systems in accordance with one or more of the various embodiments. In one or more of the various embodiments, distributed file systems may be comprised of one or more file system management computers that each manage a portion of the distributed file system. Accordingly, in this example, for some embodiments, distributed file system 502 may be comprised of file system portion 504, file system portion 506, file system portion 508, or the like.

In some embodiments, each file system portion may be arranged to store one or more file system objects that comprise the distributed file system. In this example, for some embodiments, file system portions may be arranged to communicate over one or more networks (not shown) that enable the various file system portions to logically represent a single or unified file system. Accordingly, in this example, clients of distributed file system 502, such as, network computer 518, or the like, may access file system objects stored on distributed file system absent visibility to the arrangement of the various file system portions that comprise the distributed file system.

In some embodiments, to enable clients of distributed file systems, such as, file system 502, to seamlessly or transparently interact with the different file system portions comprising a distributed file system each file system portion may be configured similarly. Otherwise, for example, if file system portion 504 is configured differently than file system portion 506, clients of file system 502 may be required to aware of the existence of the different file system portion or the different configuration thereof. Thus, in some embodiments, such a limitation may defeat the goal of providing a distribute file system where the distributed nature of the file system is transparent to its clients.

Accordingly, in one or more of the various embodiments, each file system portion may be arranged to maintain a local data store that stores configuration information associated with the operation of the distributed file system. Note, in some embodiments, this configuration information may be information associated to the operation of the distributed file system rather than the content of location of user level file system objects.

In this example, for some embodiments, file system portion 504 may be arranged to include file system management computer 510, file object store 512, or the like. In one or more of the various embodiments, file system management computer 510 may be considered to be the same or similar to network computer 300.

In one or more of the various embodiments, file object store 512 may be comprised on one or more or object repositories, such as, object repository 512. In some embodiments, object repositories may be comprised of one or more storage devices, cloud-based data repositories, or the like.

Further, in one or more of the various embodiments, each file system portion, such file system portion 504 may include one or more profile management systems, such as, profile information 516. In one or more of the various embodiments, profile information 516 may be comprised on one or more profile catalogs, profile registers, one or more profile engines, or the like.

Likewise, in some embodiments, other file system portions in file system 502 may be arranged similarly as file system portion 504. However, for brevity and clarity a component level description has been omitted. Further, in some embodiments, file system portions in a distributed file system may be described as nodes in a cluster of nodes comprising a distributed file system.

In one or more of the various embodiments, one file system management computer in a distributed file system may be designated as the master file system management computer or master node. In some embodiments, the master node may be determined based on configuration information to account for local requirements or circumstances. Alternatively, in some embodiments, distributed file system may be arranged to automatically elect a master node from among the nodes available in a distributed file system. Thus, in some embodiments, the process for electing master nodes or the criteria thereof, may be determined based on configuration information to account for local requirements.

Accordingly, in one or more of the various embodiments, master nodes may be arranged to distribute system-wide profile information among the various nodes (e.g., file system portions) in a distributed file system. In some embodiments, profile entries may be introduced at one or more nodes and then the master nodes may be responsible for ensuring that the relevant changes to profile information has been distributed to the one or more nodes that may depend the changes.

In one or more of the various embodiments, a master management console or application (not shown) may be provided to enable authorized users to submit changes for distribution across a distributed file system. In some embodiments, such management consoles may be hosted by the master node. In other embodiments, each node may host a management console that forwards change information to a master node file system-wide distribution. Also, in some embodiments, a given node may temporarily be granted or obtain take role of master to distribute changes to profile information. Accordingly, in one or more of the various embodiments, management computers at each file system portion may be arranged to distribute changes to profile information or confirm that the changes have been applied across the file system. For example, in some embodiments, configuration changes may be provided from any node in a file system. And, the change itself may be persisted in an atomic and cluster-coherent way for all observers (other nodes) in the file system as described herein. In some embodiments, the persistence of the change (configuration information changes) may be distributed without a designated master. However, for brevity and clarity the master/client idiom is presented as a useful way to describe change notifications in distributed file system from the perspective of an individual change where the node providing or managing the change may be described as a master.

In one or more of the various embodiments, profile information may be associated with a profile generation such that if all the nodes in distributed file system have profile information at the same generation then the profile information may be considered consistent across the distributed file system. Thus, in some embodiments, if one or more nodes have profile information associated with a different generation than the current generation, the file system may be considered to be in an inconsistent state. Accordingly, in such cases, for some embodiments, a master node may initiate one or more actions to restore profile consistency across the distributed file system. In some embodiments, a profile generation may be to referred as a quorum. Accordingly, in some embodiments, nodes in a distributed file system have profile information in the same quorum, the distributed file system may be considered to be in a consistent configuration state.

Figure 6:
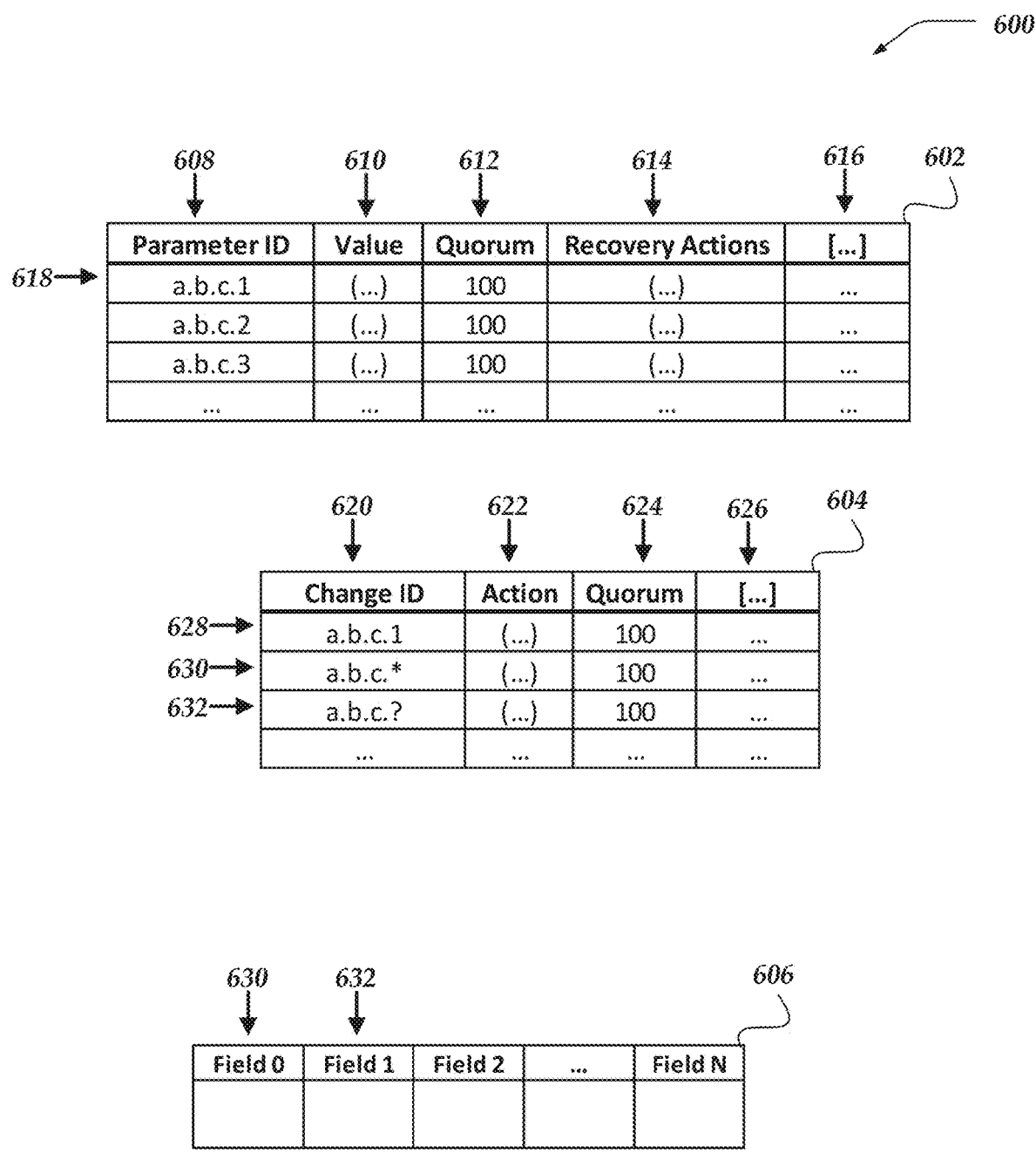
FIG. 6 illustrates a logical schematic of data structures for change notification in distributed file systems in accordance with one or more of the various embodiments.

FIG. 6 illustrates a logical schematic of data structures 600 for change notification in distributed file systems in accordance with one or more of the various embodiments.

In one or more of the various embodiments, profile information employed for system-wide configuration, or the like, may be stored in profile catalogs, such as, profile catalog 602. In some embodiments, profile catalogs may be arranged to provide the ground truth for determining the values for various profile parameters that may be employed in the distributed file system.

Accordingly in some embodiments, profile catalogs may be arranged to include records or entries for each profile parameter. In some embodiments, a profile catalog, such as, profile catalog 602 may be arranged to have one or more fields, such as, parameter identifier 608, parameter value 610, quorum 612, recovery actions 614, or the like.

In some embodiments, parameter identifier 608 may be identifiers that uniquely identify a particular parameter across the distributed file system. In some embodiments, parameter value 610 may be the value for a particular parameter. In some embodiments, the parameter value may be literal values, such as, integers, scalars, Booleans, floating points, strings, or the like. In some embodiments, parameter values may be data structures represented using JSON, XML, Blobs, or the like. Also, in some embodiments, parameter values may be references to other data or instructions that may be stored elsewhere.

In some embodiments, quorum sigil 612 may represent the value of the profile generation that may be associated with a particular profile parameter. In this example, for some embodiments, quorum sigils is represent an integer. However, one of ordinary skill in the art will appreciate that the other types of values may be employed as quorum sigil values, including, strings, or the like.

In one or more of the various embodiments, recovery actions 614 may be arranged to store or reference one or more actions that profile engines may be arranged to be executed if a quorum may be broken. Note, in some embodiments, recovery actions may be stored separate from a profile catalog. Also, in some embodiment, profile engines may be arranged to employ one or more recovery actions for restoring the distributed file system to a quorum rather than associating recovery actions with individual profile catalog records or profile parameters.

Further, in this example, for some embodiments column 616 may represent one or more additional fields that may be included in a profile catalog, such as, subscriber information, recovery information, or the like.

In some embodiments, profile identifiers may be formatted such that one or more parameters may be hierarchically arranged or otherwise grouped. Alternatively, in some embodiments, profile identifiers may be strictly unique identifiers, such as, GUIDs, integers, strings, or the like. In some embodiments, profile engines may be arranged to determine one or more features of parameter identifiers, such as, initial values, default values, ranges, namespaces, data types, formatting, or the like, based on configuration information to account for local requirements or local circumstances.

In this example, for some embodiments, record 618 may be a profile parameter record. Accordingly, in this example, for some embodiments, record 618 represents a profile parameter that is identified as a.b.c.1 in quorum 100.

In one or more of the various embodiments, profile registers, such as, profile register 604 may be arranged to store the profile information for a particular node. In one or more of the various embodiments, profile registers may be arranged to define the actions that should be executed by the profile engine or file system engine at a particular node in response to changes to profile information. In some embodiments, profile registers, such as, profile register 604 may be arranged to include fields, such as, change identifier 620, change action(s) 622, quorum sigil 624, additional fields 626, or the like.

In one or more of the various embodiments, profile engines may be arranged to employ profile registers to determine how to respond changes in profile information. Accordingly, in some embodiments, each record in profile register 604 defines one or more actions to take in response to change to profile information. In some embodiments, if a profile parameter changes, one or more records a node's profile register may be employed to determine the local actions that may be taken, if any.

In one or more of the various embodiments, in response to profile parameter changes, profile engines at individual nodes may be arranged to determine if there is a profile register record that corresponds to the profile parameter. If so, the profile engine at a given node may execute the actions associated with the profile register record. In one or more of the various embodiments, if the change actions fail to execute successfully, the profile engine may be arranged to take various actions to report the failure to the master node that initiated the change.

In some embodiments, change identifier values may be pattern or rule-based such that a register record may be configured to match one or more profile parameters. Thus, in some embodiments, profile engine may determine a profile register record based on the profile parameter identifier matching a pattern rather than matching exactly. In this example, for some embodiments, profile register record 628 has a change identifier that specifies and exact match. Thus, in some embodiments, change actions associated with record 628 may be executed if the profile parameter having the identifier 'a.b.c.1' changes. In contrast, in some embodiments, change actions associated with record 630 or record 632 may be executed for one or more profile parameters changes. In this example, for some embodiments, record 630 may be considered to match profile parameters that have identifiers that begin with 'a.b.c' regardless of what follows, such as, a.b.c.1, a.b.c.d.e.f, or the like. Similarly, in this example, record 632 may be considered to match profile parameters that have identifiers that start with a.b.c and have one or more field value, such as, a.b.c.1, a.b.c.x, or the like.

In this example, the pattern matching is described as using a limited form of regular expressions. However, one of ordinary skill in the art will appreciate that other pattern matching regimes may be employed without departing from the scope of the innovations described herein. For example, in some embodiments, if profile parameter identifiers may be comprised of bitmaps or integers, bit masking may be employed for change identifiers. Accordingly, in one or more of the various embodiments, the particular pattern matching regime, if any, may vary depending on local circumstances or requirements. Accordingly, in some embodiments, profile engines may be arranged to employ configuration information to determine the particular pattern matching regime to employ, if any.

In one or more of the various embodiments, profile parameter identifiers, such as, profile parameter identifier 606 may be arranged to comprised of meaningful fields. In some embodiments, the different fields may be arranged for grouping profile parameters to help organize the various profile parameters of distributed file system. Accordingly, in one or more of the various embodiments, profile parameters associated with a particular distributed file system sub-system (e.g., encryption) may be associated with a value at field 632 that corresponds to that sub-system. Similarly, in some embodiments, field 634 may be associated with a value representing a sub-group of system or category represented by field 632.

Further, in one or more of the various embodiments, profile catalogs or profile registers may be maintained on some or all nodes in distributed file systems. Also, in some embodiments, some or all of the information included in profile catalogs or profile registers may be included in a profile data structure that may be a combination of a profile catalog and profile register. Accordingly, in some embodiments, each node may be arranged to include a profile catalog, profile register, or the like, or combination thereof.

Generalized Operations

Figure 7:
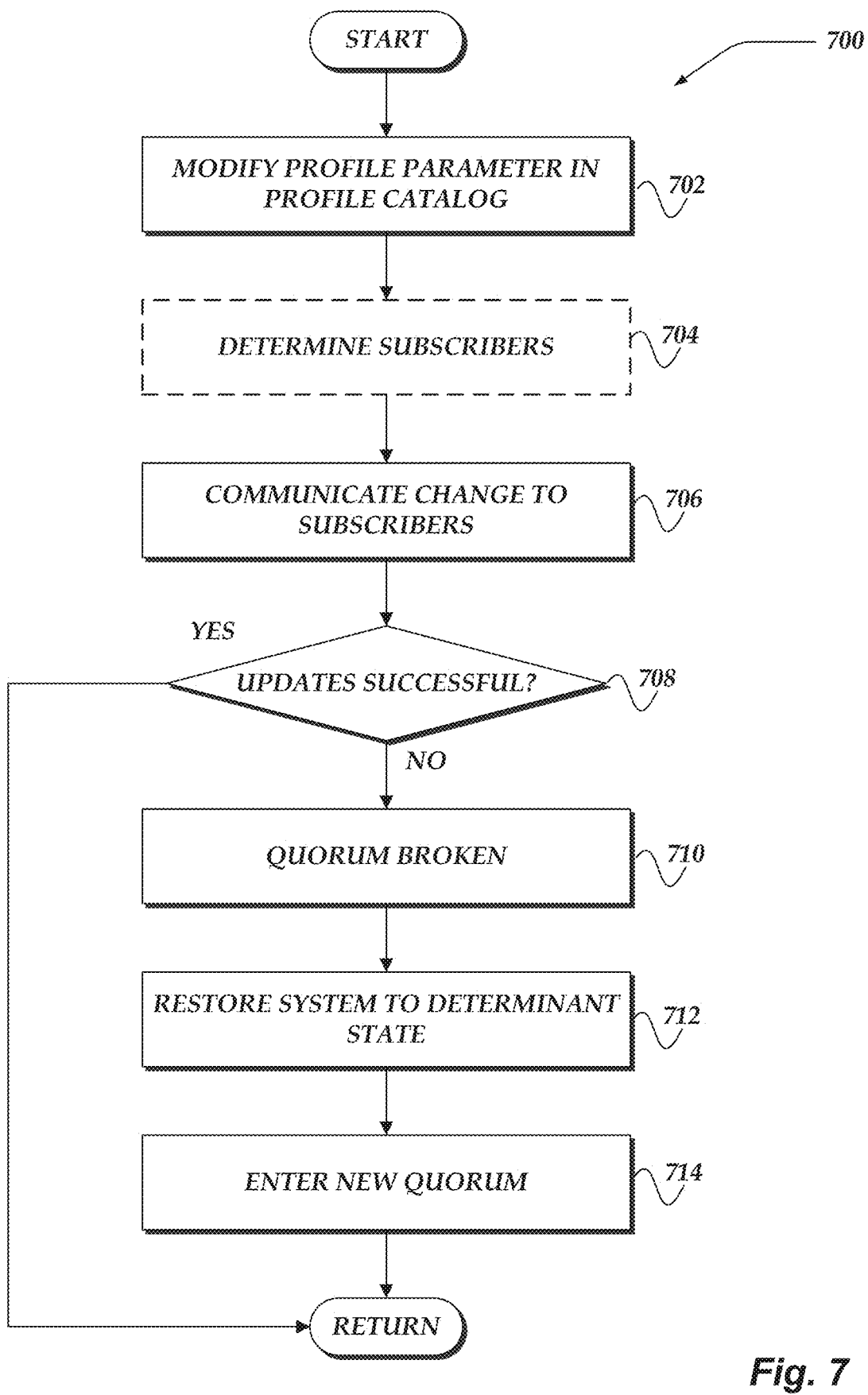
FIG. 7 illustrates an overview flowchart of a process for change notification in distributed file systems in accordance with one or more of the various embodiments.
Figure 8:
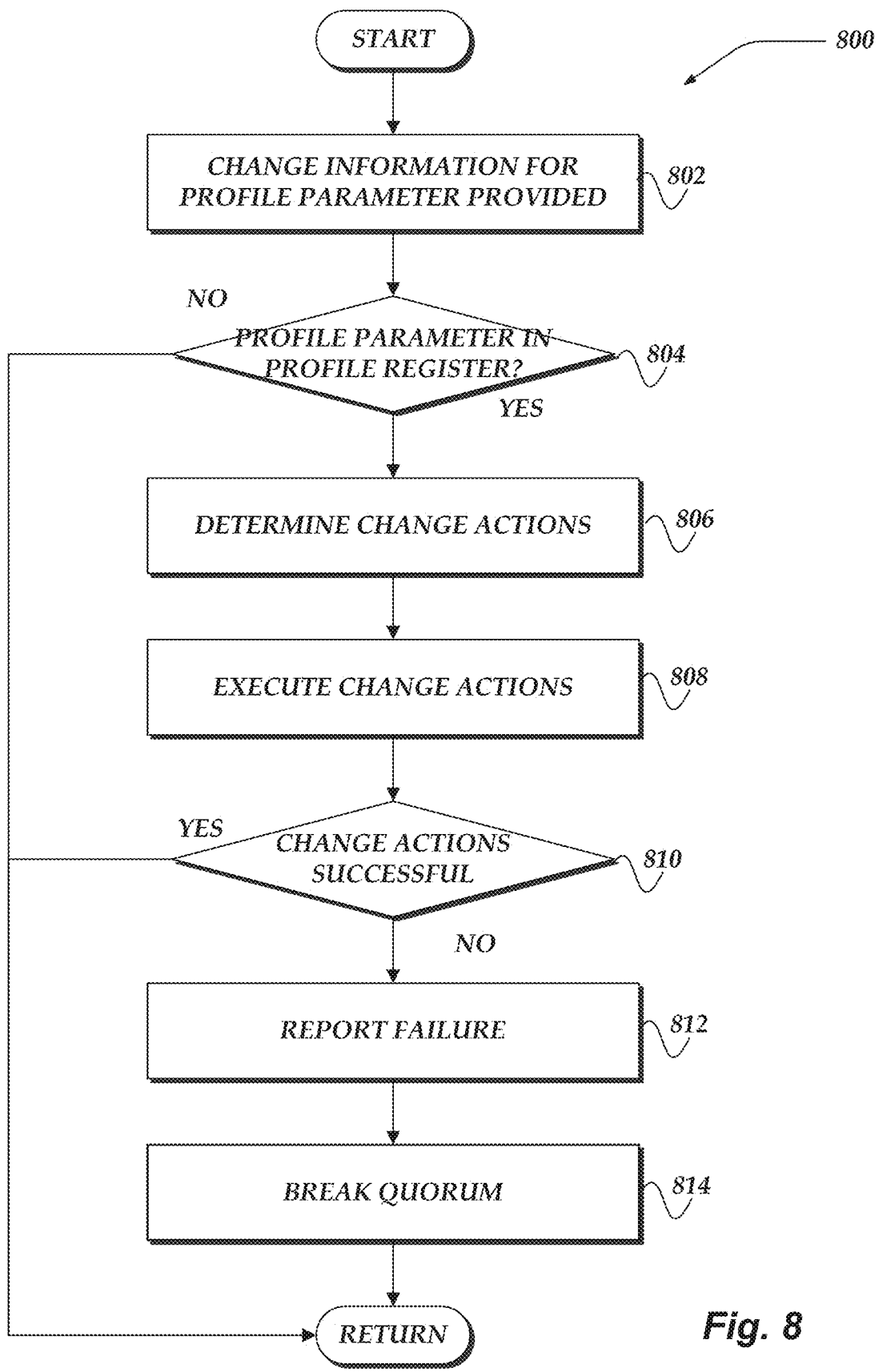
FIG. 8 illustrates a flowchart of a process for processing change information for change notification in distributed file systems in accordance with one or more of the various embodiments.
Figure 9:
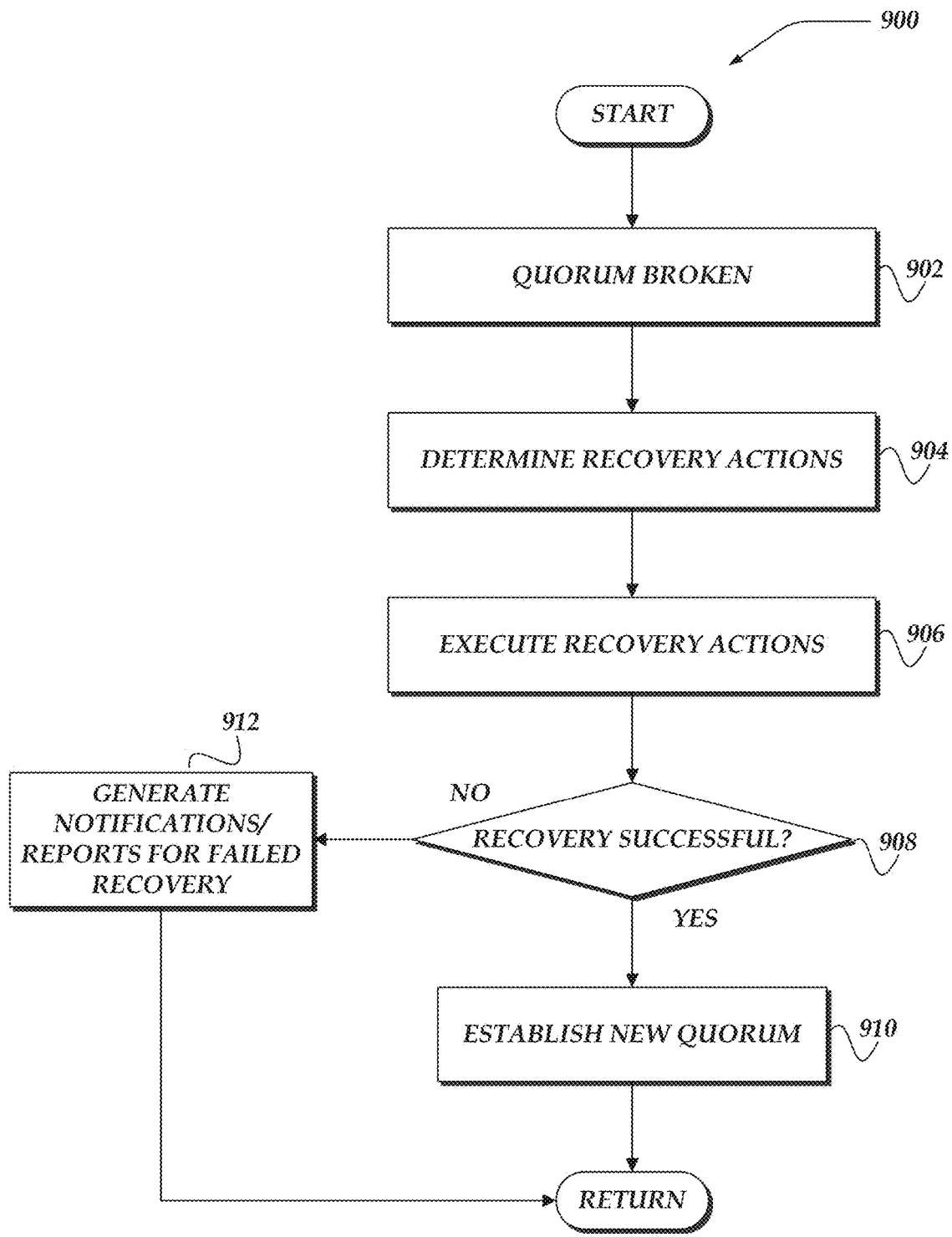
FIG. 9 illustrates a flowchart for of a process for reestablishing a quorum after recovery actions for change notification in distributed file systems in accordance with one or more of the various embodiments.

FIGS. 7-9 represent generalized operations for change notification in distributed file systems in accordance with one or more of the various embodiments. In one or more of the various embodiments, processes 700, 800, and 900 described in conjunction with FIGS. 7-9 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 7-9 may perform actions for change notification in distributed file systems in accordance with at least one of the various embodiments or architectures such as those described in conjunction with FIGS. 4-6. Further, in one or more of the various embodiments, some or all of the actions performed by processes 700, 800, and 900 may be executed in whole or in part by file system engine 322, profile engine 324, or the like.

FIG. 7 illustrates an overview flowchart for process 700 for change notification in distributed file systems in accordance with one or more of the various embodiments. After a start block, at block 702, in one or more of the various embodiments, one or more profile parameters in a profile catalog may be changed. In one or more of the various embodiments, one or more users may be authorized to change one or more profile parameters of a distributed file system. Accordingly, in one or more of the various embodiments, such users may be enabled to initiate one or more profile parameter changes via one or more administration user interfaces, such as, command consoles, graphical user interfaces, edits to configuration information, or the like.

In some embodiments, one or more profile parameters may be related or dependent such that a change to one or more profile parameters may cause one or more other profile parameters to be automatically changed as well.

In one or more of the various embodiments, changed profile parameters may be recorded in a profile catalog associated with distributed file system. In some embodiments, profile catalogs may be maintained by master nodes. In some embodiments, one or more file system management computers may be configured to manage the distributed file system. In some embodiments, file system management computers may be separate from distributed file system nodes or otherwise unassociated with storage devices used by nodes in the distributed file system. In other embodiment, file system management computers may be nodes in the distributed file system.

At block 704, in one or more of the various embodiments, optionally, profile engines may be arranged to determine one or more nodes that may be subscribed to receive change notification for the one or more profile parameters that may be changed. In one or more of the various embodiments, distributed file system may be arranged to maintain a subscriber list nodes that may be responsive to particular profile parameters. For example, in one or more of the various embodiments, there may be one or more profile parameters that may be relevant to some nodes and not others. Accordingly, in one or more of the various embodiments, profile engines may be arranged to maintain a mapping of profile parameter identifier to node identifiers that correspond to subscribers.

Note, in some embodiments, this block may be optional. In some embodiments, profile engines may be configured to broadcast change notification to all the nodes in a distributed file system rather than determining one or more subscribers for changes to a particular profile parameter.

At block 706, in one or more of the various embodiments, the profile engine may be arranged to communicate the change information associated with the one or more changed profile parameters to one or more nodes in the distributed file system. In some embodiments, a profile engine associated with a master node may be arranged to broadcast the change information to one or more other nodes in the distributed file system. In some embodiments, profile engines may be arranged to communicate the change information directly to one or more nodes subscribed to receive change information for particular profile parameters.

In some embodiments, profile engines may be arranged to confirm delivery of the change information based on acknowledgment communications. Accordingly, in some embodiments, profile engines may be arranged to resend or re-transmit change information one or more times if the expected acknowledgments may not be received.

Alternatively, in one or more of the various embodiments, profile engines may be arranged to send change information using a fire-and-forget protocol.

At decision block 708, in one or more of the various embodiments, if the subscribed nodes successfully execute change actions associated with the one or more changed profile parameters, control may be returned to a calling process; otherwise, control may flow to block 710.

In one or more of the various embodiments, profile engines may be arranged to assume the nodes have successfully processed the change information unless an error or exception may be received. In some embodiments, delivery of change information to a node may be in the context of transaction or a compound transaction such that if the delivery completes without error, the master node profile engines may be arranged to assume that the change information was processed successfully by the node. For example, in one or more of the various embodiments, if the change information is communicated using a synchronous XML-RPC call, the master node profile engines may be arranged to consider the change information processed successfully at the completion of the RPC call unless an error code or error response is returned.

In one or more of the various embodiments, profile engines may be arranged to asynchronously communicate the change information to one or more nodes assuming that they will be processed successfully at the receiving node. Thus, in one or more of the various embodiments, if one or more receiving nodes fail to successfully process the change information, those nodes may communicate an error message to the master node profile engine that sent the change information.

In one or more of the various embodiments, profile engines may be arranged to employ different communication strategies for different profile parameters. In some embodiments, one or more profile parameters may be more important than others. Likewise, in some embodiments, change actions associated one or more profile parameters may be more complex or more prone to errors that other profile parameters. Thus, in some embodiments, profile engines may be configured to employ communication protocols that may be tailored to one or more characteristics of particular profile parameters or the change actions associated with the profile parameters.

Further, in one or more of the various embodiments, the importance of data stored on distributed file systems may vary among organizations or within an organization. Likewise, in one or more of the various embodiments, individual profile parameter may have different importance or priority. Thus, in some embodiments, one distributed file system may be arranged to use a reliable communication protocol to distribute change information while another distributed file system may be configured use unreliable communication protocols depending on local requirements or local circumstances. Similarly, in one or more of the various embodiments, within the same distributed file system, profile engines may be arranged to use different communication protocols for different profile parameters. Accordingly, in some embodiments, profile engines may be arranged to determine communication protocols, acknowledgment protocols, transaction contexts, or the like for distributed file systems or profile parameters based on configuration information.

At block 710, in one or more of the various embodiments, in response to the failure by one or more nodes to execute one or more change actions associated with the one or more changed profile parameters, the profile engine at a master node may break the current quorum. In one or more of the various embodiments, if changes to profile parameters succeed, the quorum may be maintained. In some embodiments, profile engines may be arranged to employ a quorum sigil that may be used to represent if a distributed file system is in quorum. In some embodiments, quorum sigils may be flags, integers, strings, or the like. In some embodiments, each node in the distributed file system may store a quorum sigil value, thus if the quorum sigil value stored for each node is the same, the distributed file system may be considered to be in quorum.

In one or more of the various embodiments, thus, breaking the quorum may include changing the quorum sigil value (e.g., incrementing an integer, toggling a flag, or the like) such that one or more nodes in the distributed file system are associated with differently valued quorum sigils.

In one or more of the various embodiments, profile engines may be arranged to associate quorum sigils with individual profile parameters. Thus, in some embodiments, failures associated with one or more profile parameters may result in the quorum for the effected profile parameters to be broken rather than breaking the quorum for all profile parameters in the distributed file system.

At block 712, in one or more of the various embodiments, the profile engine or file system engine at master node may execute one or more actions to restore consistency to the profile information across the distributed file system. In one or more of the various embodiments, if a quorum is not in effect (no quorum), the distributed file system may be considered to be in an inconsistent state. In some embodiments, inconsistency may be based on one or more profile parameters on one or more nodes having different values. Or, in some embodiments, the failure of one or more change actions may have left one or more nodes an indeterminate state.

Accordingly, in one or more of the various embodiments, profile engines or file system engines may be arranged to determine one or more actions to automatically restore the file system to a known state. In some embodiments, one or more recovery actions may be associated with profile parameters in the profile catalog for the distributed file system. Also, in some embodiments, profile engines may be arranged to associate recovery actions with profile parameters in separate data structure or data store.

In some embodiments, recovery actions may include halting or suspending the operation of the distributed file system until consistency (e.g., a new quorum) may be restored. However, in some embodiments, some profile parameters may be restored to a consistent state while the distributed file system remains operative.

Also, in one or more of the various embodiments, profile engines may be arranged to suspend operations for a portion of the file system rather than suspending operations for the entire distributed file system.

In one or more of the various embodiments, one or more recovery actions may include generating notifications or reports to one or more responsible users. In some cases, notifications may be the only available remedy for one or more change information failures.

At block 714, in one or more of the various embodiments, the profile engine at the master node may be arranged to define a new quorum based on the success of restoring the profile information of the distributed file system to consistent or correct state. In one or more of the various embodiments, establishing a new quorum includes communicating to one or more interested nodes that there is a new quorum. In one or more of the various embodiments, if this communication step fails, there is not a new quorum.

In some embodiments, if the recovery actions have restored the distributed file system to a consistent state, profile engines may be arranged to establish a new quorum. Accordingly, in some embodiments, if the operations of the distributed file system have been suspended, the profile engines or file system engine may be configured the distributed file system to resume regular operations.

Next, in one or more of the various embodiments, control may be returned to a calling process.

FIG. 8 illustrates a flowchart for process 800 for processing change information for change notification in distributed file systems in accordance with one or more of the various embodiments. After a start block, at block 802, in one or more of the various embodiments, change information associated with a changed profile parameter may be provided to a node in the distributed file system. In one or more of the various embodiments, change information may include various fields or values, including, profile parameter identifiers, one or more values representing the new values the profile parameters, timestamps, source of one or more changes, or the like. In one or more of the various embodiments, change information may include additional information, such as, hint information, request for acknowledgments, priority information, success or failure criteria, responsible users, or the like.

In one or more of the various embodiments, the change information may be provided using one or more data structures or data formats. For example, in some embodiments, change information may be provided using one or more conventional formats, such as, JSON, XML, or the like. Also, in some embodiments, custom or hybrid formats may be employed. Accordingly, in one or more of the various embodiments, profile engines may be arranged to employ one or more rules, grammars, dictionaries, or the like, provided via configuration information to account for local circumstances or local requirements. In some embodiments, profile engine may be arranged to receive change information in two or more formats. Accordingly, in some embodiments, profile engines may be arranged to execute one or more preliminary actions to interrogate the provided change information to determine how to parse or interpret the change information.

Also, in one or more of the various embodiments, profile engines may be arranged to provide or be associated with one or more APIs for receiving change information. In some embodiments, such APIS may be arranged to support REST calls, XML-RPC, or the like.

At decision block 804, if the profile parameter may be found in the profile register, control may flow to block 806; otherwise, control may be returned to a calling process.

As described above, in some embodiments, each node in a distributed file system may be arranged to maintain a local profile register that maps profile parameter identifiers to change actions. Accordingly, in some embodiments, if the profile parameter identifiers included in the change information match one or more records in the profile register, the change actions associated with the matched records may be determined.

In one or more of the various embodiments, profile engines may be arranged to execute one or more pattern matching actions to determine if change identifiers in the profile register match the profile parameter identifiers included in the change information. In some embodiments, profile engines may be arranged to employ one or more of regular expressions, bit masks, hashing (e.g., hash keys), various search actions (e.g., binary search), or the like, to determine if profile parameter identifiers included in the change information may be included in profile registers.

At block 806, in one or more of the various embodiments, the profile engine may be arranged to determine one or more change actions that may be associated with the one or more changed profile parameters. In one or more of the various embodiments, the one or more profile register records may be associated with one or more change actions. In some embodiments, a single profile register record may be associated with two or more change actions. Also, in some embodiments, if multiple change actions may be associated with the same profile parameter, there may be a corresponding number of profile register records.

At block 808, in one or more of the various embodiments, the profile engine may be arranged to execute the one or more change actions. In one or more of the various embodiments, change actions may be references to computer readable instructions that may be executed by the profile engine of file system engine.

In one or more of the various embodiments, change actions may include storing a local representation of the profile parameter value. In one or more of the various embodiments, change actions may include execution of one or more instructions to effect one or more results associated with the changed profile parameter.

For example, in some embodiments, if a profile parameter is a timeout or expiry value, the value may be set to a value included in the change information and then subsequently employed by the file system engine at the node. In contrast, in some embodiments, one or more changed profile parameters may require that the profile engine performs one or more actions. For example, for some embodiments, if a changed profile parameter indicates that a non-encrypted file system should be encrypted, the corresponding change actions may include validating cryptographic keys, generating temporary backup files, encrypting existing file system objects, deleting the backup files, or the like.

In one or more of the various embodiments, change actions may be defined directly using computer readable instructions, such as, scripts, object code, or the like. In some embodiments, change actions may reference one or more custom or system libraries, plug-ins, drivers, or the like. In some embodiments, change actions may include calling out to internal or external services via one or more APIs. For example, in one or more of the various embodiments, a change action may include validating cryptographic credentials using local or third-party PKI services, or the like.

In one or more of the various embodiments, change actions may be described using conventional or custom domain specific languages that may be parsed or mapped to executable instructions compatible with the operating system or cloud computing environment associated with the node.

At decision block 810, in one or more of the various embodiments, if the change actions are successful, control may be returned to a calling process; otherwise, control may flow to block 812. In some embodiments, if multiple change actions are being executed or a given change action has more than one part, a failure by one or more of the change actions or one or more of change action parts may be considered a failure.

In one or more of the various embodiments, the criteria for determining success or failure may vary depending on the change actions or the profile parameters. In some embodiments, the success criteria for one or more profile parameter changes may be provided to the node as part of the change information. In other embodiments, the success criteria for one or more profile parameter changes may be defined in the profile register.

Note, in some embodiments, the profile engine or file system engine running on or associated with the node may be arranged to perform one or more local error recovery actions. Accordingly, in some embodiments, if the local recovery actions fail, a change action may be considered as failing.

At block 812, in one or more of the various embodiments, the profile engine may be arranged to report the failure of the one or more change actions to the master node. In one or more of the various embodiments, profile engines may be arranged to report failures to the master node that provided the change information. In some embodiments, errors may be automatically reported using an exception throwing mechanism that may be part of the communication protocol or API employed by master node to provide the change information to the node in the distributed file system.

In some embodiments, profile engines at the node level may catch locally thrown exceptions and forward an error notification to the master node over a network connection. Also, in some embodiments, profile engines running on master nodes may be configured to check the status of a profile parameter change at one or more nodes. For example, in some embodiments, a master node profile engine may be arranged to request the profile parameter value from a node after the expiry of a timeout value to confirm if the profile parameter change was successful.

Further, in one or more of the various embodiments, master node profile engines may be arranged to expect explicit acknowledgment messages that confirm the success or failure of a profile parameter change.

At block 814, in one or more of the various embodiments, optionally, the profile engine may be arranged to break the quorum for the one or more profile parameters. As described above, if a quorum is in effect, the distributed file system may be assumed to be in a consistent state at least with respect to profile parameters. However, in one or more of the various embodiments, if there may be an error at one or more nodes, the quorum may be considered broken.

In one or more of the various embodiments, quorum may be maintained by the master node. Accordingly, in some embodiments, if the master node determines that a profile parameter change has failed or caused an error, it may break the quorum. For example, in one or more of the various embodiments, if the current quorum is represented using a monotonically increasing integer, the master node may increment the current quorum value. Accordingly, in one or more of the various embodiments, because nodes in the distributed file system may be associated with a different quorum value, the distributed file system may be considered to be in an inconsistent or indefinite state.

In some embodiments, profile engines at nodes may be arranged to directly break the quorum. In other embodiments, changing or breaking quorum may be restricted to the profile engine of the master node.

Next, in one or more of the various embodiments, control may be returned to a calling process.

FIG. 9 illustrates a flowchart for process 900 for reestablishing a quorum after recovery actions for change notification in distributed file systems in accordance with one or more of the various embodiments. After a start block, at block 902, in one or more of the various embodiments, a profile engine may determine the distributed file system is not in quorum.

In one or more of the various embodiments, one or more profile engines processing change information one or more nodes of the distributed file system may fail. Accordingly, in some embodiments, those profile engines may be arranged to raise an exception or otherwise report the error to a profile engine associated with a master node. In some embodiments, in response to receiving an error notification, the profile engine associated with a master node may break the quorum. In some embodiments, the quorum may be broken by changing the quorum sigil value. For example, in some embodiments, if the quorum sigil is an integer, the master profile engine may be arranged to increment the value of the quorum sigil by one. Thus, in some embodiments, nodes that may remain associated with the old quorum sigil value may be considered to be out of quorum.

In some embodiments, master profile engines may be arranged to confirm that each node may be in the quorum after a change notification has been sent. For example, in some embodiments, the master profile engine may be arranged to periodically check the other nodes after broadcasting change information to confirm if the distributed file system remains in quorum. Thus, for example, for some embodiments, a master profile engine may be arranged to consider the quorum broken if successful processing of the change information cannot be confirmed within a defined timeout period.

In some embodiments, confirming a successful change may include comparing a profile parameter value in the profile catalog to the profile parameter value stored at the other nodes. Thus, in some embodiments, upon the expiry of a defined timeout period, if one or more nodes reports an unexpected profile parameter value, the quorum may be considered broken even in the absence of a reported error.

Also, in one or more of the various embodiments, different profile parameters may be associated with different mechanism for determining the quorum is broken. For example, in some embodiments, master profile engines may be arranged to employ more immediate or more expensive mechanisms to confirm changes to profile parameters of greater importance or higher priority than used for confirm changes to profile parameters of lesser importance or lower priority. Accordingly, in one or more of the various embodiments, master profile engines may be arranged to employ rules or instructions to determine the particular mechanism for confirming changes based on configuration information to account for local circumstances or requirements.

At block 904, in one or more of the various embodiments, the profile engine may be arranged to determine one or more recovery actions. In one or more of the various embodiments, as described above, recovery actions or references to recovery actions may be included in the profile catalog. In some embodiments, recovery actions may be stored in one or more other data structures available to the profile engine rather than stored in the profile catalog.

In one or more of the various embodiments, recovery actions may include scripts or otherwise computer readable instructions that may be customized for a particular distributed file system.

At block 906, in one or more of the various embodiments, the profile engine may be arranged to execute the one or more recovery actions.

In one or more of the various embodiments, because profile parameters may have a variety of data types or purposes, the recovery actions may vary depending on the particular profile parameter. For example, in some embodiments, recovery actions associated with profile parameters that are literal values may simply resend the value to one or more nodes. In contrast, in some embodiments, one or more profile parameters may be associated with a sequence of actions or a workflow that may be executed to effect recovery.

Also, in some embodiments, master profile engines may be arranged to perform one or more actions that cause the profile engines associated with other nodes to reset or reboot such that they reset their profile parameters using the values from the profile catalog. For example, in some embodiments, a master profile engine may be arranged to broadcast a message to the other nodes that triggers them to fetch updated profile parameters from the profile catalog. Likewise, for example, in some embodiments, master profile engines may be arranged to send a message to one or more other nodes that triggers there associated profile engines the reinitialize their associated profile registers.

Further, in some embodiments, the other profile engines may be arranged to association one or more local recovery actions (similar to change actions) that may be executed by the local profile engine. In some embodiments, the local recovery actions for some profile parameters may be the same as the change actions associated with those profile parameters. In some embodiments, the local recovery actions for some profile parameters may be different than the change actions associated with those profile parameters.

In some embodiments, one or more recovery actions may be arranged to include generate one or more of notifications, alerts, reports, log entries, or the like, as they execute.

At decision block 908, in one or more of the various embodiments, if the recovery actions are successful, control may flow to block 910; otherwise, control may flow to block 912. Similar to determining if change information has been processed successfully, master profile engines may be arranged to determine if one or more recovery actions have failed.

In one or more of the various embodiments, in response to failed recovery actions, master profile engines may be arranged to initiate additional or subsequent recovery actions. In some embodiments, master profile engines may be arranged to attempt low impact recovery actions before trying one or more recovery actions that have a greater impact. For example, in some embodiments, a first attempt may send an updated profile parameter value to one or more nodes while upon failure of the first attempt, the one or more nodes may be rebooted, or the like.

At block 910, in one or more of the various embodiments, the profile engine may be arranged to establish a new quorum for the distributed file system. In one or more of the various embodiments, establishing a new quorum indicates the distributed file system may be in a determinate or stable state. Accordingly, in some embodiments, if user access to the distributed file system has been disabled, the master profile engine may be arranged to enable access again and return the distributed file system to otherwise normal operations.

Next, in one or more of the various embodiments, control may be returned to a calling process.

At block 912, in one or more of the various embodiments, the profile engines may be arranged to generate one or more notifications or reports associated with the failed recovery attempt. In one or more of the various embodiments, master profile engines may be configured to abort or otherwise cancel a recovery attempt based on one or more conditions, such as, number-of-tries exceeding a limit, a timeout or delay value, or the like. Accordingly, in some embodiments, if such conditions are met, the master profile engine may be arranged to terminate the recovery operation and generate one or more of notifications, alerts, reports, log entries, or the like. In some embodiments, master profile engines may be arranged to determine the recovery failure condition based on configuration information to account for local circumstances or local requirements.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors that execute instructions to perform actions, comprising:
    providing a file system that includes a master node and one or more client nodes, wherein the master node is associated with a master quorum value and the one or more client nodes are associated with a client quorum value that is equivalent to master quorum value;
    providing a profile catalog that is associated with the master node, wherein the profile catalog includes a plurality of parameters associated with the file system;
    providing one or more profile registers that are associated with the one or more client nodes, wherein each profile register is associated with one or more parameters that are associated with one or more parameter identifiers stored in the one or more profile registers;
    executing one or more change actions on each client node based on change information provided by the master node, wherein the change information is associated with the one or more parameters, wherein the one or more change actions are associated with the one or more parameter identifiers;
    in response to one or more error results associated with the execution of the one or more change actions, performing further, actions, including:
    suspending access to the file system;
    modifying the master quorum value to indicate that the file system is out of quorum;
    employing the master node to execute one or more recovery actions that distribute the plurality of parameters to each client node in the file system; and
    modifying the client quorum value at each client node to correspond with the master quorum value, wherein access to the file system is restored.

2. The method of claim 1, further comprising:
    determining one or more parameter identifiers based on the change information; and
    determining the one or more change actions based on the one or more parameter identifiers and the one or more profile registers.

3. The method of claim 1, wherein executing the one or more change actions, further comprises:
    determining one or more parameter values based on the change information;
    performing one or more operations to configure the one or more client nodes based on the one or more parameter values; and
    communicating an error message to the master node when the one or more operations results in an error.

4. The method of claim 1, wherein the plurality of parameters, further comprise, values representing one or more of encryption settings, replication schedules, or timeout values.

5. The method of claim 1, wherein executing one or more recovery actions, further comprises:
comparing a value of each parameter on each client node to a value of each of the plurality parameters included in the profile catalog;
in response to a comparison result indicating a mismatch between one or more parameter values on a client node to one or more of a plurality of parameter values stored in the profile catalog, performing further actions, retrying the execution of the one or more recovery actions; and
in response to a failure of the one or more recovery actions, generating one or more notifications to indicate that a change notification has failed and access to the file system remains suspended.

6. A system for managing data in a file system comprising:
a network computer, comprising:
a transceiver that communicates over the network;
a memory that stores at least instructions; and
one or more processors that execute instructions that perform actions, including:
providing a file system that includes a master node and one or more client nodes, wherein the master node is associated with a master quorum value and the one or more client nodes are associated with a client quorum value that is equivalent to master quorum value;
providing a profile catalog that is associated with the master node, wherein the profile catalog includes a plurality of parameters associated with the file system;
providing one or more profile registers that are associated with the one or more client nodes, wherein each profile register is associated with one or more parameters that are associated with one or more parameter identifiers stored in the one or more profile registers;
executing one or more change actions on each client node based on change information provided by the master node, wherein the change information is associated with the one or more parameters, wherein the one or more change actions are associated with the one or more parameter identifiers; and
in response to one or more error results associated with the execution of the one or more change actions, performing further, actions, including:
suspending access to the file system;
modifying the master quorum value to indicate that the file system is out of quorum;
employing the master node to execute one or more recovery actions that distribute the plurality of parameters to each client node in the file system; and
modifying the client quorum value at each client node to correspond with the master quorum value, wherein access to the file system is restored; and
a client computer, comprising:
a transceiver that communicates over the network;
a memory that stores at least instructions; and
one or more processors that execute instructions that perform actions, including, modifying the one or more parameters.

7. The system of claim 6, wherein the one or more network computer processors execute instructions that perform actions, further comprising:
determining one or more parameter identifiers based on the change information; and
determining the one or more change actions based on the one or more parameter identifiers and the one or more profile registers.

8. The system of claim 6, wherein executing the one or more change actions, further comprises:
determining one or more parameter values based on the change information;
performing one or more operations to configure the one or more client nodes based on the one or more parameter values; and
communicating an error message to the master node when the one or more operations results in an error.

9. The system of claim 6, wherein the plurality of parameters, further comprise, values representing one or more of encryption settings, replication schedules, or timeout values.

10. The system of claim 6, wherein executing one or more recovery actions, further comprises:
comparing a value of each parameter on each client node to a value of each of the plurality parameters included in the profile catalog;
in response to a comparison result indicating a mismatch between one or more parameter values on a client node to one or more of a plurality of parameter values stored in the profile catalog, performing further actions, retrying the execution of the one or more recovery actions; and
in response to a failure of the one or more recovery actions, generating one or more notifications to indicate that a change notification has failed and access to the file system remains suspended.

11. A processor readable non-transitory storage media that includes instructions for managing data in a file system over a network, wherein execution of the instructions by one or more processors on one or more network computers performs actions, comprising:
providing a file system that includes a master node and one or more client nodes, wherein the master node is associated with a master quorum value and the one or more client nodes are associated with a client quorum value that is equivalent to master quorum value;
providing a profile catalog that is associated with the master node, wherein the profile catalog includes a plurality of parameters associated with the file system;
providing one or more profile registers that are associated with the one or more client nodes, wherein each profile register is associated with one or more parameters that are associated with one or more parameter identifiers stored in the one or more profile registers;
executing one or more change actions on each client node based on change information provided by the master node, wherein the change information is associated with the one or more parameters, wherein the one or more change actions are associated with the one or more parameter identifiers; and
in response to one or more error results associated with the execution of the one or more change actions, performing further, actions, including:
suspending access to the file system;
modifying the master quorum value to indicate that the file system is out of quorum;
employing the master node to execute one or more recovery actions that distribute the plurality of parameters to each client node in the file system; and modifying the client quorum value at each client node to correspond with the master quorum value, wherein access to the file system is restored.

12. The media of claim 11, further comprising:
determining one or more parameter identifiers based on the change information; and
determining the one or more change actions based on the one or more parameter identifiers and the one or more profile registers.

13. The media of claim 11, wherein executing the one or more change actions, further comprises:
determining one or more parameter values based on the change information;
performing one or more operations to configure the one or more client nodes based on the one or more parameter values; and
communicating an error message to the master node when the one or more operations results in an error.

14. The media of claim 11, wherein the plurality of parameters, further comprise, values representing one or more of encryption settings, replication schedules, or timeout values.

15. The media of claim 11, wherein executing one or more recovery actions, further comprises:
comparing a value of each parameter on each client node to a value of each of the plurality parameters included in the profile catalog;
in response to a comparison result indicating a mismatch between one or more parameter values on a client node to one or more of a plurality of parameter values stored in the profile catalog, performing further actions, retrying the execution of the one or more recovery actions; and
in response to a failure of the one or more recovery actions, generating one or more notifications to indicate that a change notification has failed and access to the file system remains suspended.

16. A network computer for managing data in a file system, comprising:
a transceiver that communicates over the network;
a memory that stores at least instructions; and
one or more processors that execute instructions that perform actions, including:
providing a file system that includes a master node and one or more client nodes, wherein the master node is associated with a master quorum value and the one or more client nodes are associated with a client quorum value that is equivalent to master quorum value;
providing a profile catalog that is associated with the master node, wherein the profile catalog includes a plurality of parameters associated with the file system;
providing one or more profile registers that are associated with the one or more client nodes, wherein each profile register is associated with one or more parameters that are associated with one or more parameter identifiers stored in the one or more profile registers;
executing one or more change actions on each client node based on change information provided by the master node, wherein the change information is associated with the one or more parameters, wherein the one or more change actions are associated with the one or more parameter identifiers; and
in response to one or more error results associated with the execution of the one or more change actions, performing further, actions, including:
suspending access to the file system;
modifying the master quorum value to indicate that the file system is out of quorum;
employing the master node to execute one or more recovery actions that distribute the plurality of parameters to each client node in the file system; and
modifying the client quorum value at each client node to correspond with the master quorum value, wherein access to the file system is restored.

17. The network computer of claim 16, wherein the one or more processors execute instructions that perform actions, further comprising:
determining one or more parameter identifiers based on the change information; and
determining the one or more change actions based on the one or more parameter identifiers and the one or more profile registers.

18. The network computer of claim 16, wherein executing the one or more change actions, further comprises:
determining one or more parameter values based on the change information;
performing one or more operations to configure the one or more client nodes based on the one or more parameter values; and
communicating an error message to the master node when the one or more operations results in an error.

19. The network computer of claim 16, wherein the plurality of parameters, further comprise, values representing one or more of encryption settings, replication schedules, or timeout values.

20. The network computer of claim 16, wherein executing one or more recovery actions, further comprises:
comparing a value of each parameter on each client node to a value of each of the plurality parameters included in the profile catalog;
in response to a comparison result indicating a mismatch between one or more parameter values on a client node to one or more of a plurality of parameter values stored in the profile catalog, performing further actions, retrying the execution of the one or more recovery actions; and
in response to a failure of the one or more recovery actions, generating one or more notifications to indicate that a change notification has failed and access to the file system remains suspended.

* * * * *